(12) United States Patent
Shimizu et al.

(10) Patent No.: US 11,250,708 B2
(45) Date of Patent: Feb. 15, 2022

(54) MOVING OBJECT CONTROL APPARATUS, MOVING OBJECT CONTROL METHOD, AND MOVING OBJECT

(71) Applicant: Sony Corporation, Tokyo (JP)

(72) Inventors: Itaru Shimizu, Tokyo (JP); Noriko Tanaka, Tokyo (JP); Kazuyuki Marukawa, Kanagawa (JP); Asako Kaneko, Tokyo (JP)

(73) Assignee: Sony Corporation, Tokyo (JP)

( * ) Notice: Subject to any disclaimer, the term of this patent is extended or adjusted under 35 U.S.C. 154(b) by 134 days.

(21) Appl. No.: 16/326,487

(22) PCT Filed: Aug. 14, 2017

(86) PCT No.: PCT/JP2017/029253
§ 371 (c)(1),
(2) Date: Feb. 19, 2019

(87) PCT Pub. No.: WO2018/037954
PCT Pub. Date: Mar. 1, 2018

(65) Prior Publication Data
US 2020/0043344 A1 Feb. 6, 2020

(30) Foreign Application Priority Data
Aug. 26, 2016 (JP) .............. JP2016-165709

(51) Int. Cl.
*G08G 1/00* (2006.01)
*G06K 9/00* (2022.01)
(Continued)

(52) U.S. Cl.
CPC ......... *G08G 1/202* (2013.01); *G06K 9/00369* (2013.01); *G06K 9/00375* (2013.01);
(Continued)

(58) Field of Classification Search
CPC ............ G08G 1/202; G08G 1/096855; G06K 9/00369; G06K 9/00375; G06K 9/00818; G06Q 50/30
See application file for complete search history.

(56) References Cited

U.S. PATENT DOCUMENTS 6,008,841 A * 12/1999 Charlson ................ H04N 7/181
348/148
9,459,623 B1 * 10/2016 Raghu ................... G01S 13/931
(Continued)

FOREIGN PATENT DOCUMENTS

CN 101206799 A 6/2008
CN 202359940 U 8/2012
(Continued)

OTHER PUBLICATIONS

International Search Report and English translation thereof dated Nov. 7, 2017 in connection with International Application No. PCT/JP2017/029253.
(Continued)

*Primary Examiner* — Tyler J Lee
*Assistant Examiner* — Yufeng Zhang
(74) *Attorney, Agent, or Firm* — Wolf, Greenfield & Sacks, P.C.

(57) ABSTRACT

The present technology relates to a moving object control apparatus, a moving object control method, and a moving object that make it possible to properly perform driving of a moving object in accordance with a person getting on the moving object or a candidate therefor and a person getting off the moving object or a candidate therefor. The moving object control apparatus includes a driving control unit that performs, on the basis of recognition of at least one of a candidate for getting on the moving object or a candidate for getting off the moving object, acceleration/deceleration control of the moving object. The present technology is appli-
(Continued)

cable to, for example, a moving object such as a bus and a taxi, or a control apparatus that controls automatic driving or semi-automatic driving of the moving object.

18 Claims, 23 Drawing Sheets

(51) Int. Cl.
 *G06Q 50/30* (2012.01)
 *G08G 1/0968* (2006.01)
(52) U.S. Cl.
 CPC ......... *G06K 9/00818* (2013.01); *G06Q 50/30* (2013.01); *G08G 1/096855* (2013.01)

(56) References Cited

U.S. PATENT DOCUMENTS

| | | | |
|---|---|---|---|
| 2013/0334307 A1* | 12/2013 | Kwong | G06Q 50/30 235/382 |
| 2015/0166009 A1 | 6/2015 | Outwater et al. | |
| 2015/0232064 A1* | 8/2015 | Cudak | B60R 25/31 701/23 |
| 2016/0161266 A1 | 6/2016 | Crawford | |
| 2016/0171313 A1* | 6/2016 | Huang | G06K 9/00791 382/103 |
| 2016/0224974 A1 | 8/2016 | Yang | |
| 2017/0025005 A1* | 1/2017 | Barth | G08G 1/166 |
| 2017/0120804 A1* | 5/2017 | Kentley | B60W 30/08 |
| 2017/0277191 A1* | 9/2017 | Fairfield | G08G 1/005 |

FOREIGN PATENT DOCUMENTS

| | | |
|---|---|---|
| CN | 202472939 U | 10/2012 |
| CN | 102857686 A | 1/2013 |
| CN | 103927521 A | 7/2014 |
| CN | 104827989 A | 8/2015 |
| CN | 105701442 A | 6/2016 |
| JP | 2000-285363 A | 10/2000 |
| JP | 2006-119889 A | 5/2006 |
| JP | 2010-176221 A | 8/2010 |
| JP | 2011-227550 A | 11/2011 |
| WO | WO 2016/002527 A1 | 1/2016 |

OTHER PUBLICATIONS

Extended European Search Report dated Sep. 16, 2019 in connection with European Application No. 17843437.9.
Written Opinion and English translation thereof dated Nov. 7, 2017 in connection with International Application No. PCT/JP2017/029253.
International Preliminary Report on Patentability and English translation thereof dated Mar. 7, 2019 in connection with International Application No. PCT/JP2017/029253.

* cited by examiner

MOVING OBJECT CONTROL APPARATUS, MOVING OBJECT CONTROL METHOD, AND MOVING OBJECT

CROSS-REFERENCE TO RELATED APPLICATIONS

This application claims the benefit under 35 U.S.C. § 371 as a U.S. National Stage Entry of International Application No. PCT/JP2017/029253, filed in the Japanese Patent Office as a Receiving Office on Aug. 14, 2017, which claims priority to Japanese Patent Application Number JP2016-165709, filed in the Japanese Patent Office on Aug. 26, 2016, each of which is hereby incorporated by reference in its entirety.

TECHNICAL FIELD

The present technology relates to a moving object control apparatus, a moving object control method, and a moving object, and particularly to a moving object control apparatus, a moving object control method, and a moving object that are suitable for performing automatic driving or semi-automatic driving.

BACKGROUND ART

In the past, a system for performing driving assistant of a vehicle capable of platooning by automatic driving (see, for example, Patent Literature 1).

CITATION LIST

Patent Literature

Patent Literature 1: Japanese Patent Application Laid-open No. 2000-285363

DISCLOSURE OF INVENTION

Technical Problem

However, the invention described in Patent Literature 1 is directed to the vehicle capable of platooning, and it is necessary to develop infrastructure such as a traffic control system, a dedicated road, and a boarding platform having a push button device. Therefore, a case where a moving object including a vehicle such as a bus and a taxi performs automatic driving or semi-automatic driving by itself is not considered.

The present technology has been made in view of the above-mentioned circumstances to make it possible to properly perform driving of a moving object on the basis of a person getting on the moving object or a candidate therefor and a person getting off the moving object or a candidate therefor.

Solution to Problem

A moving object control apparatus according to a first aspect of the present technology includes a driving control unit that performs, on a basis of recognition of at least one of a candidate for getting on a moving object or a candidate for getting off the moving object, acceleration/deceleration control of the moving object.

The driving control unit may perform, on a basis of at least one of the recognition of the candidate for getting on or the recognition of the candidate for getting off, stop control of the moving object.

The driving control unit may perform, on a basis of at least one of recognition of getting on the moving object of the candidate for getting on or recognition of getting off the moving object of the candidate for getting off, starting control of the moving object.

The recognition of the candidate for getting on may be performed on an area in a vicinity of a predetermined stop candidate point of the moving object.

A priority recognition area may be set on a basis of a predetermined reference position in the stop candidate point, the candidate for getting on being preferentially recognized in the priority recognition area.

The reference position may be at least one of a sign indicating the stop candidate point, a predetermined structure at the stop candidate point, or a predetermined boarding position at the stop candidate point.

The priority recognition area may be further set on a basis of at least one of a configuration of the stop candidate point or a situation around the stop candidate point.

The reference position may be changed depending on a situation around the stop candidate point.

The area to be recognized may be set to a predetermined area in a predetermined direction with respect to the moving object.

The recognition of the candidate for getting on may be performed on a basis of at least one of a face, an orientation of a line of sight, a position, or behavior of a person recognized in an image captured by an imaging unit of the moving object.

The recognition of the candidate for getting on may be further performed on a basis of an image captured by an imaging apparatus outside the moving object.

The recognition of the candidate for getting on or the candidate for getting off may be performed on a basis of face authentication using an image of a face of the candidate for getting on or the candidate for getting off or data indicating a feature amount of the face, the image and the data being acquired in advance.

The moving object control apparatus may further include a plurality of imaging units for recognizing the candidate for getting on or the candidate for getting off in different directions or different positions in the moving object, in which the imaging unit used for processing of recognizing the candidate for getting on or the candidate for getting off may be changed between when the moving object moves and when the moving object stops.

The recognition of the candidate for getting off may be performed on a basis of at least one of a position or behavior of an occupant of the moving object in an image obtained by imaging an inside of the moving object.

The moving object control apparatus may further include a user interface control unit that controls notification of a recognition result of the candidate for getting on.

The user interface control unit may superimpose, on an image captured by an imaging unit of the moving object, information indicating the recognition result of the candidate for getting on, and displays the image.

The user interface control unit may superimpose, on a field of view of an occupant of the moving object, information indicating the recognition result of the candidate for getting on, for display.

A moving object control method according to a first aspect of the present technology includes a driving control step of performing, on a basis of recognition of at least one of a candidate for getting on a moving object or a candidate for getting off the moving object, acceleration/deceleration control of the moving object.

A moving object according to a second aspect of the present technology includes a driving control unit that performs, on a basis of recognition of at least one of a candidate for getting on or a candidate for getting off, acceleration/deceleration control.

In the first aspect or the second aspect of the present technology, acceleration/deceleration control is performed on the basis of recognition of at least one of a candidate for getting on or a candidate for getting off.

Advantageous Effects of Invention

In accordance with the present technology, it is possible to properly perform driving of a moving object in accordance with a person getting on the moving object or a candidate therefor or a person getting off the moving object or a candidate therefor.

It should be noted that the effect described here is not necessarily limitative and may be any effect described in the present disclosure.

BRIEF DESCRIPTION OF DRAWINGS

FIG. 16 is a diagram for describing a first example of processing of recognizing a candidate for getting on.

FIG. 17 is a diagram for describing a second example of the processing of recognizing a candidate for getting on.

FIG. 18 is a diagram for describing an example of a method of switching the image used for the processing of recognizing a candidate for getting on.

MODE(S) FOR CARRYING OUT THE INVENTION

Hereinafter, embodiments for carrying out the present technology will be described. Description will be made in the following order.

1. Basic Configuration Example of Vehicle
2. First embodiment (Example Applied to Bus that Performs Automatic Driving)
3. Second embodiment (First Example Applied to Taxi that Performs Automatic Driving)
4. Third embodiment (Second Example Applied to Taxi that Performs Automatic Driving)
5. Fourth embodiment (Example Applied to User Interface of Vehicle that Performs Semi-Automatic Driving)
6. Modified example
7. Others 1. Basic Configuration Example of Vehicle FIG. 1 is a diagram showing a basic configuration example of a vehicle to which the present technology is applied.

Figure 1:
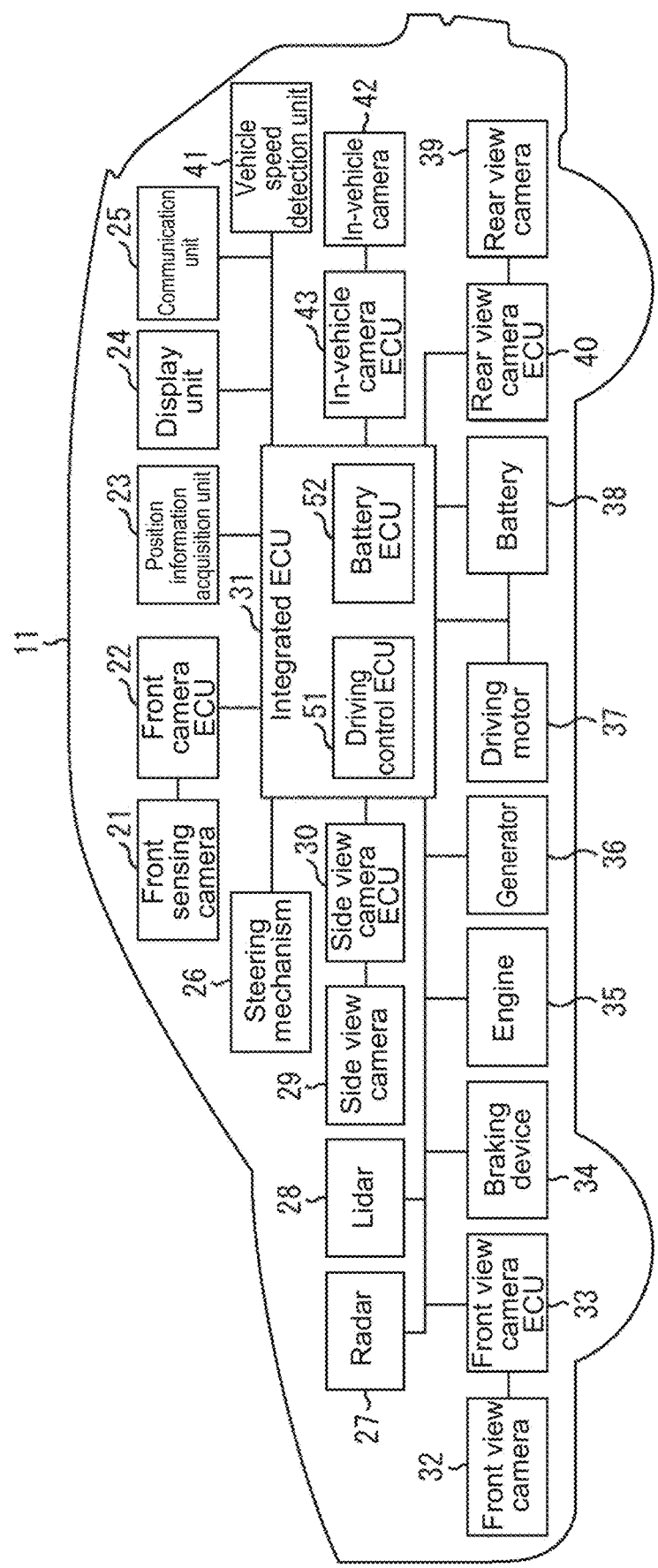
FIG. 1 is a diagram showing a configuration example of an embodiment of a vehicle to which the present technology is applied.

A vehicle 11 shown in FIG. 1 includes a front sensing camera 21, a front camera ECU (Electronic Control Unit) 22, a position information acquisition unit 23, a display unit 24, a communication unit 25, a steering mechanism 26, a radar 27, a lidar 28, a side view camera 29, a side view camera ECU 30, an integrated ECU 31, a front view camera 32, a front view camera ECU 33, a braking device 34, an engine 35, a generator 36, a driving motor 37, a battery 38, a rear view camera 39, a rear view camera ECU 40, a vehicle speed detection unit 41, an in-vehicle camera 42 and an in-vehicle camera ECU 43.

The units provided in the vehicle 11 are connected to each other by a bus for CAN (Controller Area Network) communication, another connection line, and the like. However, in order to make the figure easy to see, the bus, the connection line, and the like are drawn without particularly distinguishing them.

The front sensing camera 21 includes, for example, a camera dedicated to sensing disposed in the vicinity of a room mirror in the vehicle, images the front of the vehicle 11 as a subject, and outputs the resulting sensing image to the front camera ECU 22.

The front camera ECU 22 appropriately performs processing of improving the image quality or the like on the sensing image supplied from the front sensing camera 21, and then performs image recognition on the sensing image, thereby detecting an arbitrary object such as a white line and a pedestrian from the sensing image. The front camera ECU 22 outputs the result of image recognition to the bus for CAN communication.

The position information acquisition unit 23 includes, for example, a position information measuring system such as a GPS (Global Positioning System), detects the position of the vehicle 11, and outputs the position information indicating the detection result to the bus for CAN communication.

The display unit 24 includes, for example, a liquid crystal display panel, and is disposed at a predetermined position in the vehicle such as the center position of an instrument panel and the inside of a room mirror. Further, the display unit 24 may be a transmissive display superimposed and provided on a windshield part, or a display of a car navigation system. The display unit 24 displays various images under the control of the integrated ECU 31.

The communication unit 25 transmits/receives information to/from a peripheral vehicle, a portable terminal device possessed by a pedestrian, a roadside device, an external server, or the like by various kinds of wireless communication such as inter-vehicle communication, vehicle-to-pedestrian communication, and road-to-vehicle communication. For example, the communication unit 25 performs inter-vehicle communication with a peripheral vehicle, receives, from the peripheral vehicle, peripheral vehicle information including information indicating the number of occupants and the travelling state, and supplies it to the integrated ECU 31.

The steering mechanism 26 performs control of the traveling direction of the vehicle 11, i.e., steering angle control, in accordance with the driver's steering wheel operation or the control signal supplied from the integrated ECU 31. The radar 27 is a distance measuring sensor that measures the distance to an object such as a vehicle and a pedestrian in each direction such as forward and backward by using electromagnetic waves such as millimeter waves, and outputs the result of measuring the distance to the object to the integrated ECU 31 or the like. The lidar 28 is a distance measuring sensor that measures the distance to an object such as a vehicle and a pedestrian in each direction such as forward and backward by using light waves, and outputs the result of measuring the distance to the object to the integrated ECU 31 or the like.

The side view camera 29 is, for example, a camera disposed in a casing of a side mirror or in the vicinity of the side mirror, captures an image of the side (hereinafter, referred to also as the side image) of the vehicle 11 including an area to be a blind spot of the driver, and supplies it to the side view camera ECU 30.

The side view camera ECU 30 performs image processing of improving the image quality such as white balance adjustment on the side image supplied from the side view camera 29, and supplies the obtained side image to the integrated ECU 31 via a cable different from the bus for CAN communication.

The integrated ECU 31 includes a plurality of ECUs such as a driving control ECU 51 and a battery ECU 52 arranged at the center of the vehicle 11, and controls the operation of the entire vehicle 11.

For example, the driving control ECU 51 is an ECU realizing an ADAS (Advanced Driving Assistant System) function or an automatic driving (Self driving) function, and controls the driving (travelling) of the vehicle 11 on the basis of various kinds of information such as the image recognition result from the front camera ECU 22, the position information from the position information acquisition unit 23, the peripheral vehicle information supplied from the communication unit 25, the measurement results from the radar 27 and the lidar 28, the result of detecting the vehicle speed from the vehicle speed detection unit 41, and the like. That is, the driving control ECU 51 controls the steering mechanism 26, the braking device 34, the engine 35, the driving motor 37, and the like to control the driving of the vehicle 11.

Note that in the integrated ECU 31, a dedicated ECU may be provided for each of the functions including the ADAS function, the automatic driving function, and the like.

Further, the battery ECU 52 controls power supply or the like by the battery 38.

The front view camera 32 includes, for example, a camera disposed in the vicinity of a front grille, captures an image of the front (hereinafter, referred to also as the front image) of the vehicle 11 including an area to be a blind spot of the driver, and supplies it to the front view camera ECU 33.

The front view camera ECU 33 performs image processing of improving the image quality such as white balance adjustment on the front image supplied from the front view camera 32, and supplies the obtained front image to the integrated ECU 31 via a cable different from the bus for CAN communication.

The braking device 34 operates in accordance with the driver's braking operation or the control signal supplied from the integrated ECU 31, and stops or decelerates the vehicle 11. The engine 35 is a power source of the vehicle 11, and is driven in accordance with the control signal supplied from the integrated ECU 31.

The generator 36 is controlled by the integrated ECU 31, and generates power in accordance with driving of the engine 35. The driving motor 37 is a power source of the vehicle 11, receives power supply from the generator 36 or the battery 38, and is driven in accordance with the control signal supplied from the integrated ECU 31. Note that whether to drive the engine 35 or the driving motor 37 during travelling of the vehicle 11 is appropriately switched by the integrated ECU 31.

The battery 38 includes, for example, a battery of 12 V or a battery of 200 V, and supplies power to the respective units of the vehicle 11 in accordance with the control of the battery ECU 52.

The rear view camera 39 includes, for example, a camera disposed in the vicinity of a license plate of a tailgate, captures an image of the rear side (hereinafter, referred to also as the rear image) of the vehicle 11 including an area to be a blind spot of the driver, and supplies it to the rear view camera ECU 40. For example, the rear view camera 39 is activated when a shift lever (not shown) is moved to the position of the reverse (R).

The rear view camera ECU 40 performs image processing of improving the image quality such as white balance adjustment on the rear image supplied from the rear view camera 39, and supplies the obtained rear image to the integrated ECU 31 via a cable different from the bus for CAN communication.

The vehicle speed detection unit 41 is a sensor that detects the vehicle speed of the vehicle 11, and supplies the result of detecting the vehicle speed to the integrated ECU 31. Note that in the vehicle speed detection unit 41, from the result of detecting the vehicle speed, the acceleration, or the differential of the acceleration may be calculated. For example, the calculated acceleration is used for estimating the time until the collision of the vehicle 11 with an object.

The in-vehicle camera 42 includes, for example, a camera installed inside the vehicle 11, captures an image of the inside of the vehicle 11 (hereinafter, referred to also as the in-vehicle image), and supplies it to the in-vehicle camera ECU 43.

The in-vehicle camera ECU 43 performs, on the in-vehicle image supplied from the in-vehicle camera 42, image processing for improving the image quality such as white balance adjustment, and supplies the obtained in-vehicle image to the integrated ECU 31 via a cable different from the bust for CAN communication.

Note that hereinafter, the image obtained by capturing the outside of the vehicle 11, such as the sensing image, the side image, the front image, and the rear image, will be referred to also as the vehicle-exterior image.

Figure 2:
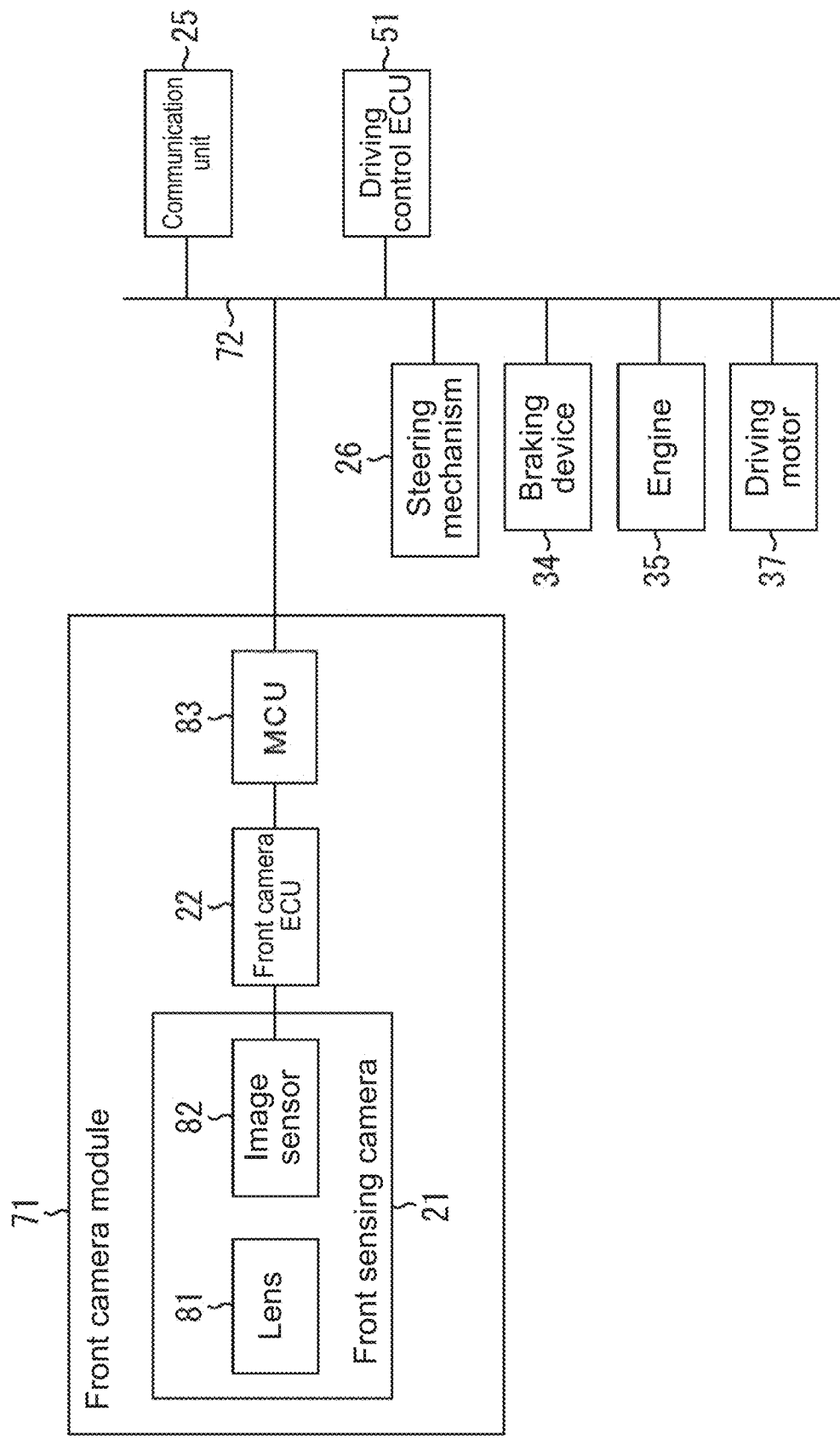
FIG. 2 is a diagram showing an example of the connection state of respective units of the vehicle.

Further, in the vehicle 11, as shown in FIG. 2, a plurality of units including a front camera module 71, the communication unit 25, the driving control ECU 51, the steering mechanism 26, the braking device 34, the engine 35, and the driving motor 37 are connected to each other via a bus 72 for CAN communication. Note that the components corresponding to those in FIG. 1 are denoted by the same reference symbols in FIG. 2, and description thereof will be appropriately omitted.

In this example, the front camera module 71 includes a lens 81, an image sensor 82, the front camera ECU 22, and an MCU (Module Control Unit) 83.

Further, the lens 81 and the image sensor 82 constitute the front sensing camera 21, and the image sensor 82 includes, for example, a CMOS (Complementary Metal Oxide Semiconductor) image sensor.

In the front camera module 71, light from a subject is collected on the imaging surface of the image sensor 82 by the lens 81. The image sensor 82 captures a sensing image by photoelectrically converting light that has entered from the lens 81, and supplies it to the front camera ECU 22.

The front camera ECU 22 performs, for example, gain adjustment, white balance adjustment, HDR (High Dynamic Range) processing, and the like on the sensing image supplied from the image sensor 82, and then performs image recognition on the sensing image.

In the image recognition, for example, a white line, a curb stone, a pedestrian, a vehicle, a headlight, a brake light, a road sign, a time until a collision with the forward vehicle, and the like are recognized (detected). The recognition results of the image recognition are converted into signals in a format for CAN communication by the MCU 83, and output to the bus 72.

Further, information supplied from the bus 72 is converted into a signal in a format defined for the front camera module 71 by the MCU 83, and supplied to the front camera ECU 22.

The driving control ECU 51 appropriately controls the steering mechanism 26, the braking device 34, the engine 35, the driving motor 37, a headlight (not shown), and the like on the basis of the result of image recognition output from the MCU 83 to the bus 72 and information supplied from other units such as the radar 27 and the lidar 28. Accordingly, driving control such as change of the travelling direction, braking, acceleration, and starting, warning notification control, headlight switching control, and the like are realized.

Further, in the case where the driving control ECU 51 realizes the automatic driving function or the like, for example, the locus of the position of the target object may be further recognized by the driving control ECU 51 from the image recognition result at each time obtained by the front camera ECU 22, and such a recognition result may be transmitted to an external server via the communication unit 25. In such a case, for example, in the server, learning such as a deep neural network is performed, and a necessary dictionary or the like is generated and transmitted to the vehicle 11. In the vehicle 11, the dictionary or the like obtained in this way is received by the communication unit 25, and the received dictionary or the like is used for various predictions and the like in the driving control ECU 51.

Note that of the controls performed by the driving control ECU 51, control that can be realized from only the result of image recognition on the sensing image may be performed not by the driving control ECU 51 but by the front camera ECU 22.

Further, in the vehicle 11, by displaying a composite image on the display unit 24 at the time of parking, for example, the around view monitor function is realized.

Figure 3:
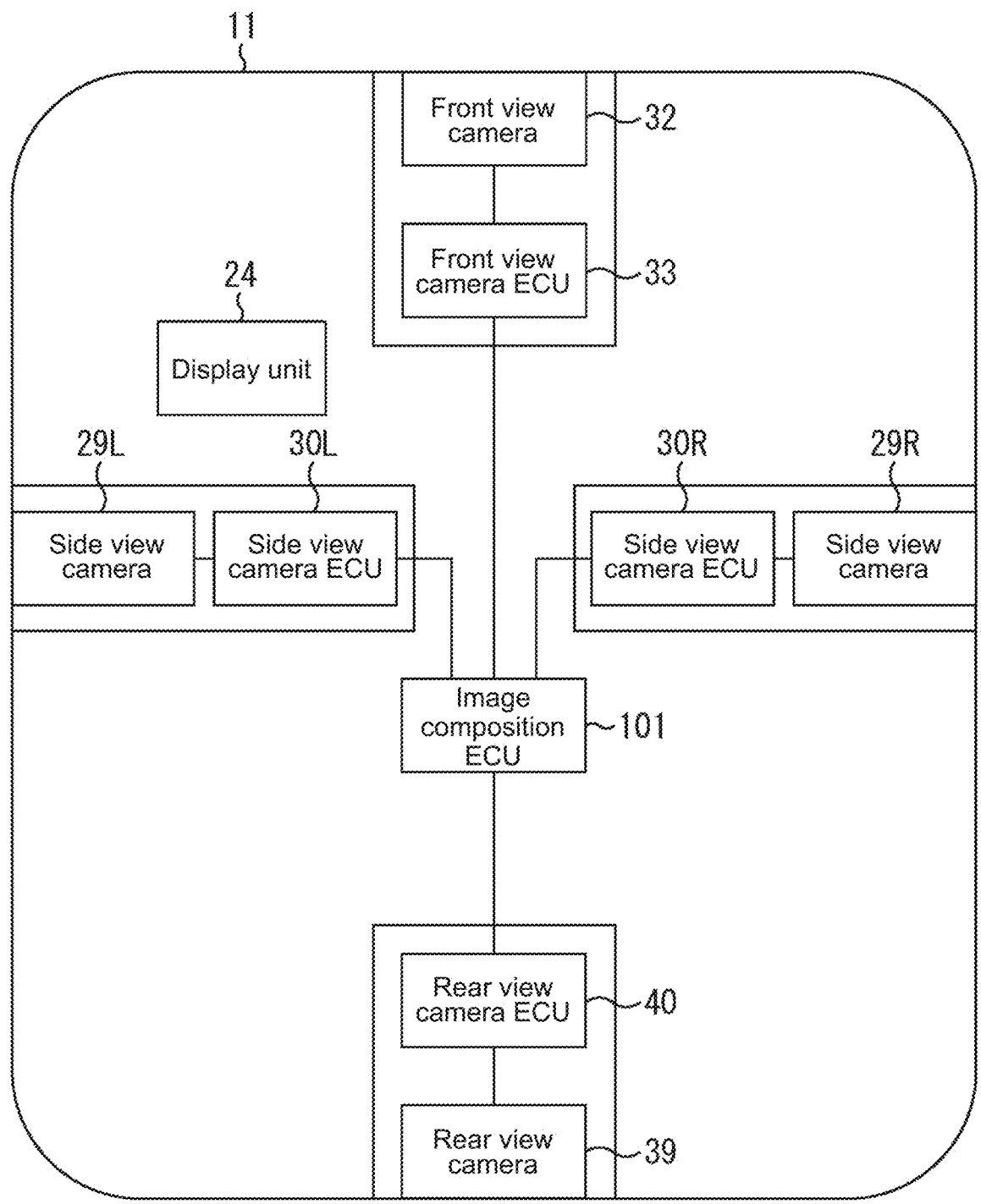
FIG. 3 is a diagram for describing a method of generating a composite image.

That is, as shown in FIG. 3, the front image, the rear image, and the side image obtained by the respective units are supplied, via a cable different from the bus for CAN communication, to an image composition ECU 101 provided in the integrated ECU 31, and a composite image is generated from the images. Note that the components corresponding to those in FIG. 1 are denoted by the same reference symbols in FIG. 3, and description thereof will be appropriately omitted.

In FIG. 3, as the side view camera 29 shown in FIG. 1, a side view camera 29L disposed on the left side of the vehicle 11 and a side view camera 29R disposed on the right side of the vehicle 11 are provided. Further, as the side view camera ECU 30, a side view camera ECU 30L disposed on the left side of the vehicle 11 and a side view camera ECU 30R disposed on the right side of the vehicle 11 are provided.

To the image composition ECU 101, the front image obtained by the front view camera 32 is supplied from the front view camera ECU 33 and the rear image obtained by the rear view camera 39 is supplied from the rear view camera ECU 40. Further, to the image composition ECU 101, the side image obtained by the side view camera 29L (hereinafter, particularly referred to also as the left side image) is supplied from the side view camera ECU 30L and the side image obtained by the side view camera 29R (hereinafter, particularly referred to also as the right side image) is supplied from the side view camera ECU 30R.

The image composition ECU 101 generates, on the basis of the supplied images, a composite image in which the front image, the rear image, the left side image, and the right side image are arranged in corresponding areas, and supplies the obtained composite image to the display unit 24 for display. The driver is capable of safely and easily parking the vehicle 11 by driving the vehicle 11 while watching the composite image displayed in this way. Note that the integrated ECU 31 may control the driving of the vehicle 11 on the basis of the composite image, and park the vehicle 11.

Note that the side view camera ECU 30, the front view camera ECU 33, and the rear view camera ECU 40 may detect an arbitrary object outside the vehicle, such as a white line and a pedestrian, from the side image, the front image, or the rear image, similarly to the front camera ECU 22. Further, the in-vehicle camera ECU 43 may detect an arbitrary object inside the vehicle, such as an occupant, from the in-vehicle image.

Further, the number or arrangement of cameras provided in the vehicle 11 described above is an example, and appropriately changed depending on the size, shape, of the like of the vehicle 11.

Figure 4:
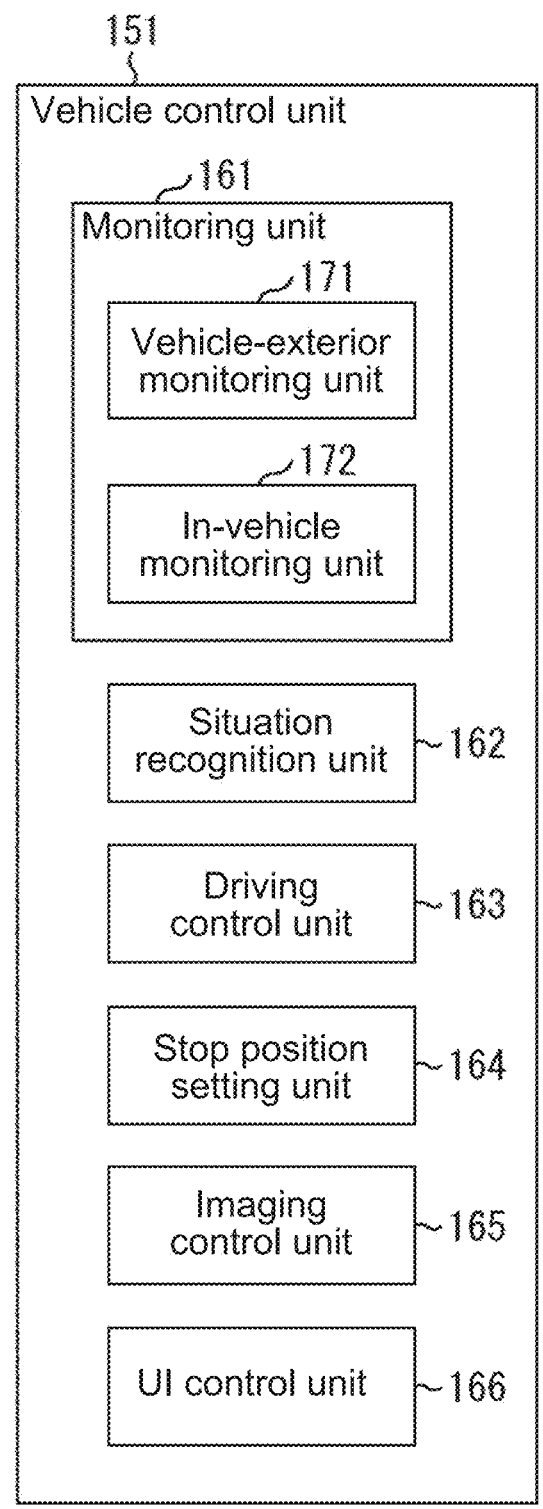
FIG. 4 is a diagram showing a part of a configuration example of a function of a vehicle control unit.

FIG. 4 shows a part of a configuration example of a function of a vehicle control unit 151 of the vehicle 11. The vehicle control unit 151 is realized by, for example, the front camera ECU 22, the side view camera ECU 30, the integrated ECU 31, the front view camera ECU 33, the rear view camera ECU 40, the in-vehicle camera ECU 43, and the like. The vehicle control unit 151 includes a monitoring unit 161, a situation recognition unit 162, a driving control unit 163, a stop position setting unit 164, an imaging control unit 165, and an UI (User Interface) control unit 166.

The monitoring unit 161 monitors the periphery and the inside of the vehicle 11. The monitoring unit 161 includes a vehicle-exterior monitoring unit 171 and an in-vehicle monitoring unit 172.

The vehicle-exterior monitoring unit 171 monitors the outside of the vehicle 11 on the basis of the vehicle-exterior image, the position information from the position information acquisition unit 23, various types of information acquired from the outside via the communication unit 25, the measurement result from the radar 27, the measurement result from the lidar 28, the detection results by various sensors (not shown) provided in the vehicle 11, and the like. For example, the vehicle-exterior monitoring unit 171 detects an arbitrary object around the vehicle 11, such as another vehicle, a human, and a white line. Further, for example, in the case where the vehicle 11 is a vehicle for carrying passengers, such as a bus and a taxi, the vehicle-exterior monitoring unit 171 performs processing of recognizing a candidate for getting on predicted to get on the vehicle 11.

The in-vehicle monitoring unit 172 monitors, on the basis of the in-vehicle image, the detection results of various sensors (not shown) provided in the vehicle 11, and the like, the inside of the vehicle 11. For example, the in-vehicle monitoring unit 172 detects an arbitrary object such as an occupant inside the vehicle. Further, for example, in the case where the vehicle 11 is a vehicle for carrying passengers, such as a bus and a taxi, the in-vehicle monitoring unit 172 performs processing of recognizing a candidate for getting off predicted to get off the vehicle 11.

The situation recognition unit 162 recognizes the situation where the vehicle 11 is placed, on the basis of the position information from the position information acquisition unit 23, the information acquired from the outside via the communication unit 25, the monitoring result from the monitoring unit 161, the detection results of various sensors (not shown) provided in the vehicle 11, and the like. Examples of the situation recognized by the situation recognition unit 162 include the current position, the current time, the weather, the temperature, the wind speed, the surrounding brightness, the road surface condition, and the time.

The driving control unit 163 controls driving of the vehicle 11 on the basis of the information acquired from the outside via the communication unit 25, the detection result of the vehicle speed from the vehicle speed detection unit 41, the monitoring result from the monitoring unit 161, the situation recognition result from the situation recognition unit 162, the driver's operation, and the like. For example, the driving control unit 163 performs starting control, stop control, acceleration/deceleration control, braking control, direction control, and the like of the vehicle 11.

Further, for example, the driving control unit 163 controls automatic driving or semi-automatic driving of the vehicle 11. Here, the automatic driving represents that all of the driving of the vehicle 11 is automated and the vehicle 11 autonomously moves without the driver's operation. The semi-automatic driving represents that a part of the driving of the vehicle 11 is automated. The range of automation of the semi-automatic driving varies from the one in which the driver performs almost all of the driving and only a part of functions, such as braking control, is automated to assist the driver to the one in which the vehicle 11 autonomously performs almost all of the driving and the driver performs a part of the operation in a supplementary manner, for example. Further, for example, the driving control unit 163 performs control for the vehicle 11 to travel with a predetermined route or schedule, and control for reaching a predetermined destination.

Further, for example, the driving control unit 163 performs control of opening/closing the door or window of the vehicle 11, control of opening/closing the door lock, control of turning on the headlight, control of tilting of the vehicle body, power supply control, and the like.

The stop position setting unit 164 sets the stop position of the vehicle 11 on the basis of the monitoring result from the monitoring unit 161, the situation recognition result from the situation recognition unit 162, and the like.

The imaging control unit 165 controls imaging by the front sensing camera 21, the side view camera 29, the front view camera 32, the rear view camera 39, and the in-vehicle camera 42 on the basis of the monitoring result from the monitoring unit 161, the situation recognition result from the situation recognition unit 162, the driving control information from the driving control unit 163, and the like.

The UI control unit 166 controls the display unit 24, a voice output unit (not shown), and the like to control the user interface for the occupant such as the driver, on the basis of the monitoring result from the monitoring unit 161, the situation recognition result from the situation recognition unit 162, the driving control information from the driving control unit 163, and the like.

2. First Embodiment

Next, a first embodiment of the present technology will be described with reference to FIG. 5 to FIG. 18. The first embodiment of the present technology is an embodiment in the case where the vehicle 11 includes a bus that performs automatic driving.

2-1. Arrangement Example of Cameras

Figure 5:
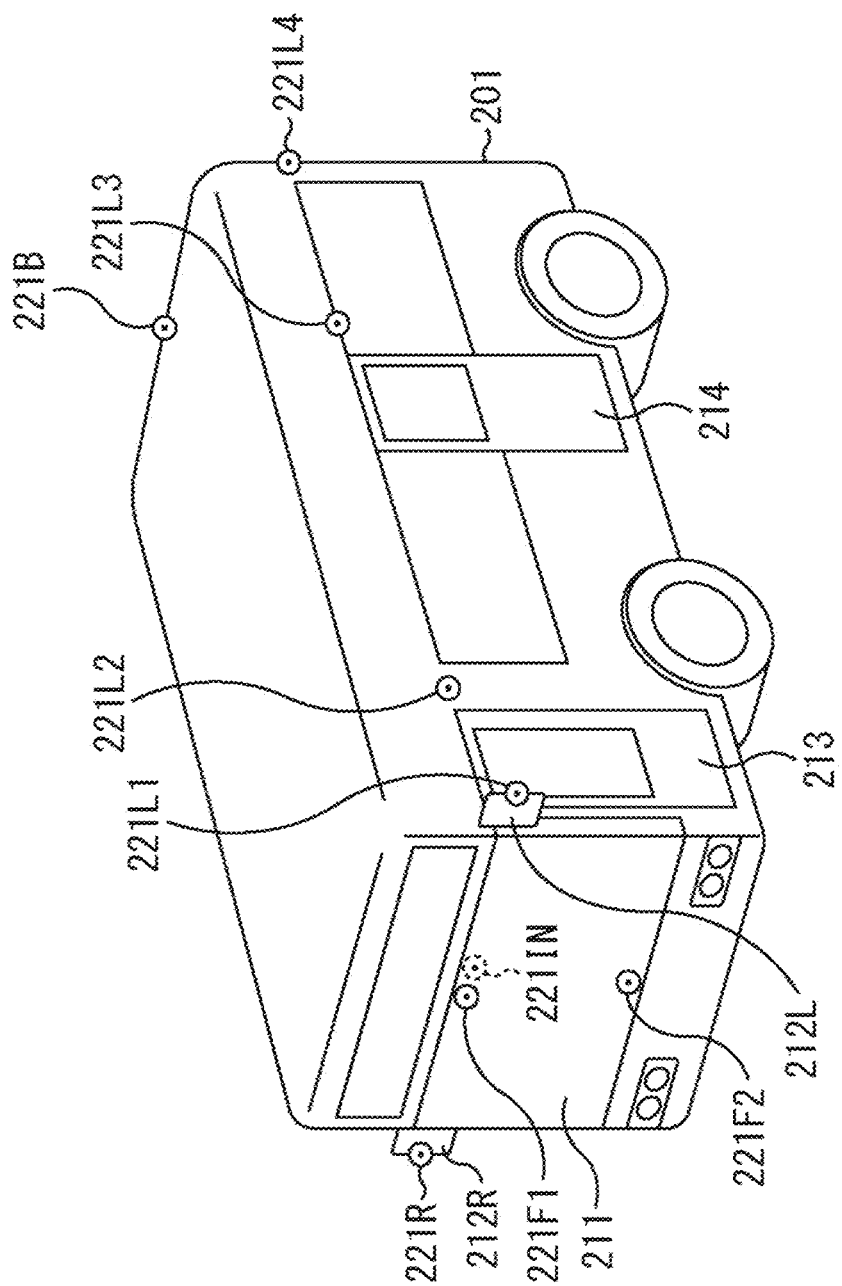
FIG. 5 is a diagram showing an arrangement example of cameras in a bus.

FIG. 5 schematically shows an arrangement example of cameras in a bus 201 as the vehicle 11 in FIG. 1.

On the bus 201, a camera 221F1 to a camera 221B are arranged as imaging units. Any one of the camera 221F1 to the camera 221B may be a stereo camera including two or more cameras, and may be capable of measuring the distance to an imaged object by the parallax of the two or more cameras. Further, any one of the camera 221F1 to the camera 221B may include a wide-angle camera having a viewing angle of not less than 120 degrees, particularly favorably, not less than 180 degrees.

The camera 221F1 and the camera 221F2 correspond to the front sensing camera 21 or the front view camera 32 in FIG. 1. The camera 221F1 is disposed, for example, in the vicinity of a room mirror (not shown) of the bus 201 and in the vicinity of the upper end in the up and down direction at the center in the right and left direction of a windshield 211, and used for mainly imaging the front of the bus 201. The camera 221F2 is disposed, for example, above a dashboard (not shown) of the bus 201 and in the vicinity of the lower end in the up and down direction at the center in the right and left direction of the windshield 211, and used for mainly imaging the front of the bus 201. Note that the camera 221F1 is used for imaging the front of the bus 201 which is more distant than the position to be imaged by the camera 221F2, and the camera 221F2 is used for imaging the front of the bus 201 which is nearer than the position to be imaged by the camera 221F1.

The camera 221L1 to the camera 221L4 correspond to the side view camera 29L in FIG. 3, and the camera 221R corresponds to the side view camera 29R in FIG. 3. The camera 221L1 is disposed, for example, in the vicinity of a left side mirror 212L of the bus 201, and used for mainly imaging the left side of the bus 201. The camera 221L2 is disposed, for example, in the vicinity of an entrance door 213 of the bus 201, and used for mainly imaging the vicinity of the entrance door 213. The camera 221L3 is disposed, for example, in the vicinity of an exit door 214 of the bus 201, and used for mainly imaging the vicinity of the exit door 214. The camera 221L4 is disposed, for example, in the vicinity of the rear end of the left side of the bus 201, and used for mainly imaging the left side of the bus 201. Note that the camera 221L1 is used for imaging the left side of the bus 201 which is in front of the camera 221L4, and the camera 221L4 is used for imaging the left side of the bus 201 which is behind the camera 221L4. The camera 221R is disposed, for example, in the vicinity of a right side mirror 212R of the bus 201, and used for mainly imaging the right side of the bus 201.

The camera 221B corresponds to the rear view camera 39 in FIG. 1. The camera 221B is disposed, for example, in the vicinity of the upper end in the up and down direction at the center in the right and left direction of the back surface of the bus 201, and use for mainly imaging the rear of the bus 201.

The camera 221IN corresponds to the in-vehicle camera 42 in FIG. 1. The camera 221IN is disposed, for example, in the vicinity of the room mirror (not shown) of the bus 201, and used for mainly imaging the inside of the vehicle. Note that a plurality of cameras 221IN may be provided in the vehicle so that no blind spot occurs inside the bus 201.

The images (vehicle-exterior images) captured by the camera 221F1, the camera 221F2, the camera 221L1 to the camera 221L4, the camera 221R, and the camera 221B are used for detecting an arbitrary object outside the vehicle, such as a white line and a pedestrian. The image (in-vehicle image) captured by the camera 221IN is used for detecting an arbitrary object such as an occupant inside the vehicle.

2-2. Automatic Stop/Departure Processing

Figure 6:
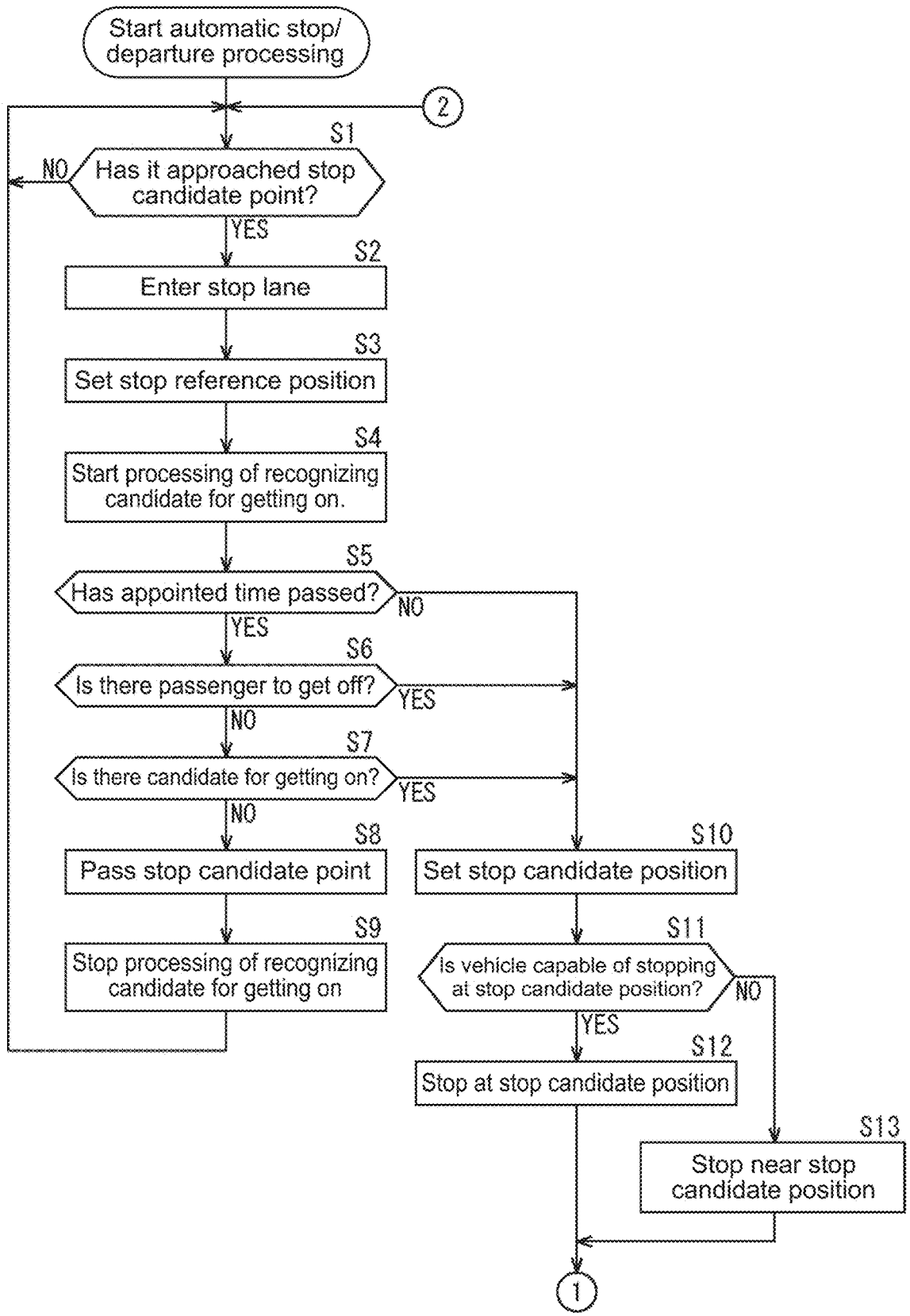
FIG. 6 is a flowchart for describing a first embodiment of automatic stop/departure processing.
Figure 7:
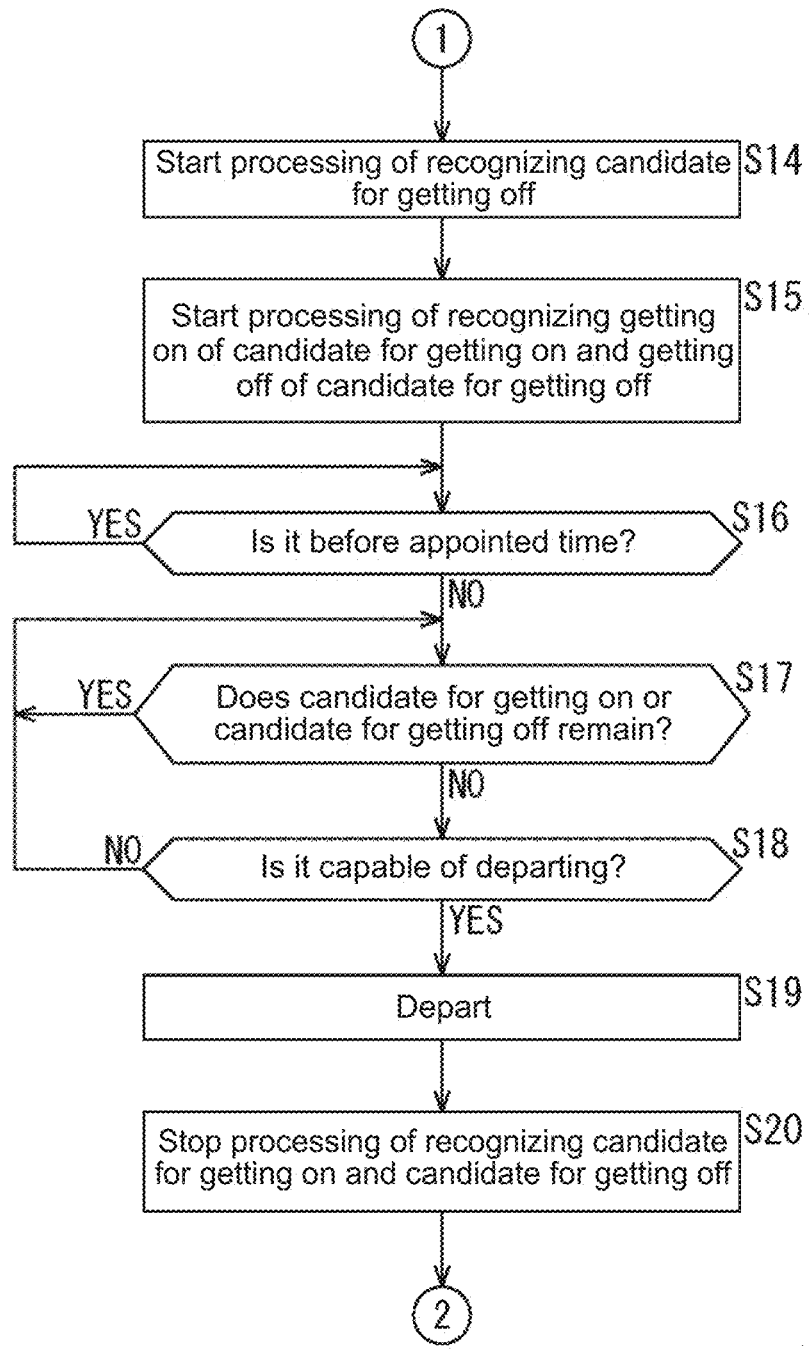
FIG. 7 is a flowchart for describing the first embodiment of automatic stop/departure processing.

Next, automatic stop/departure processing performed by the bus 201 will be described with reference to the flowcharts of FIG. 6 and FIG. 7. Note that this processing is started when an ACC (accessory) power source of the bus 201 is turned on, and finished when the ACC power source is turned off, for example.

In Step S1, the driving control unit 163 determines whether or not it has approached a stop candidate point. The stop candidate point represents, for example, a bus stop where the bus 201 is scheduled to stop next (hereinafter, referred to simply as the stop).

The vehicle control unit 151 detects the distance to the next stop first. As the method of detecting the distance to the next stop, an arbitrary method can be adopted.

For example, the situation recognition unit 162 detects the distance to the next stop on the basis of the current position of the vehicle 11 detected by the position information acquisition unit 23 and the position of the next stop in the previously held map information.

Alternatively, for example, the vehicle-exterior monitoring unit 171 detects a stop in the travelling direction of the bus 201 and further detects the distance to the stop, on the basis of the vehicle-exterior image and the detection results of the radar 27 and the lidar 28.

Alternatively, for example, the situation recognition unit 162 detects the distance to the next stop on the basis of the strength of radio waves that are emitted from the communication apparatus provided in the next stop and then received by the communication unit 25.

Alternatively, for example, the situation recognition unit 162 detects the distance to the next stop on the basis of the information regarding the position of the next stop or the distance to the next stop received by the communication unit 25 from the communication apparatus provided in the next stop.

In the case where the distance to the next stop is not less than a predetermined threshold value or detection of the distance to the next stop has failed, the driving control unit 163 determines that it is not approaching the stop candidate point. This determination processing is repeatedly executed at a predetermined timing until it is determined that it has approached the stop candidate point. Then, in the case where the distance to the next stop is less than the threshold value, the driving control unit 163 determines that it has approached the stop candidate point, and the processing proceeds to Step S2.

In Step S2, the bus 201 enters a stop lane under the control of the driving control unit 163. Here, the stop lane represents a lane where the bus 201 stops at the next stop. For example, in the case where a dedicated bus lane is provided, the dedicated bus lane is the stop lane. Meanwhile, in the case where no dedicated bus lane is provided, the lane before the next stop, e.g., the left end lane is the stop lane in the case of left-hand traffic.

Further, the bus 201 moves to the end on the side of the stop in the stop lane under the control of the driving control unit 163. Further, the UI control unit 166 controls a voice output apparatus or the like (not shown) to output an announcement for guiding the next stop.

In Step S3, the vehicle-exterior monitoring unit 171 sets a stop reference position.

Specifically, the vehicle-exterior monitoring unit 171 detects a stop first on the basis of the vehicle-exterior image.

Figure 8:
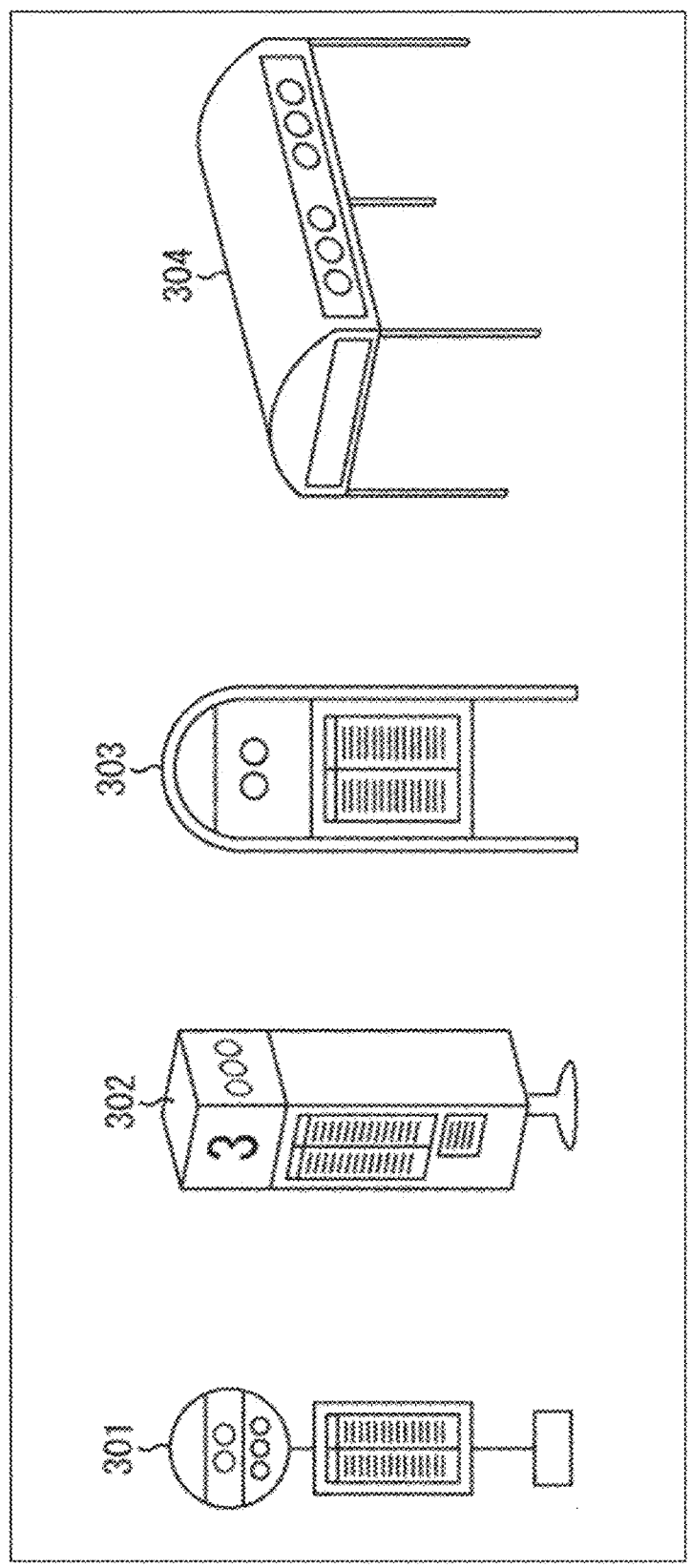
FIG. 8 is a diagram showing a type of a stop.
Figure 9:
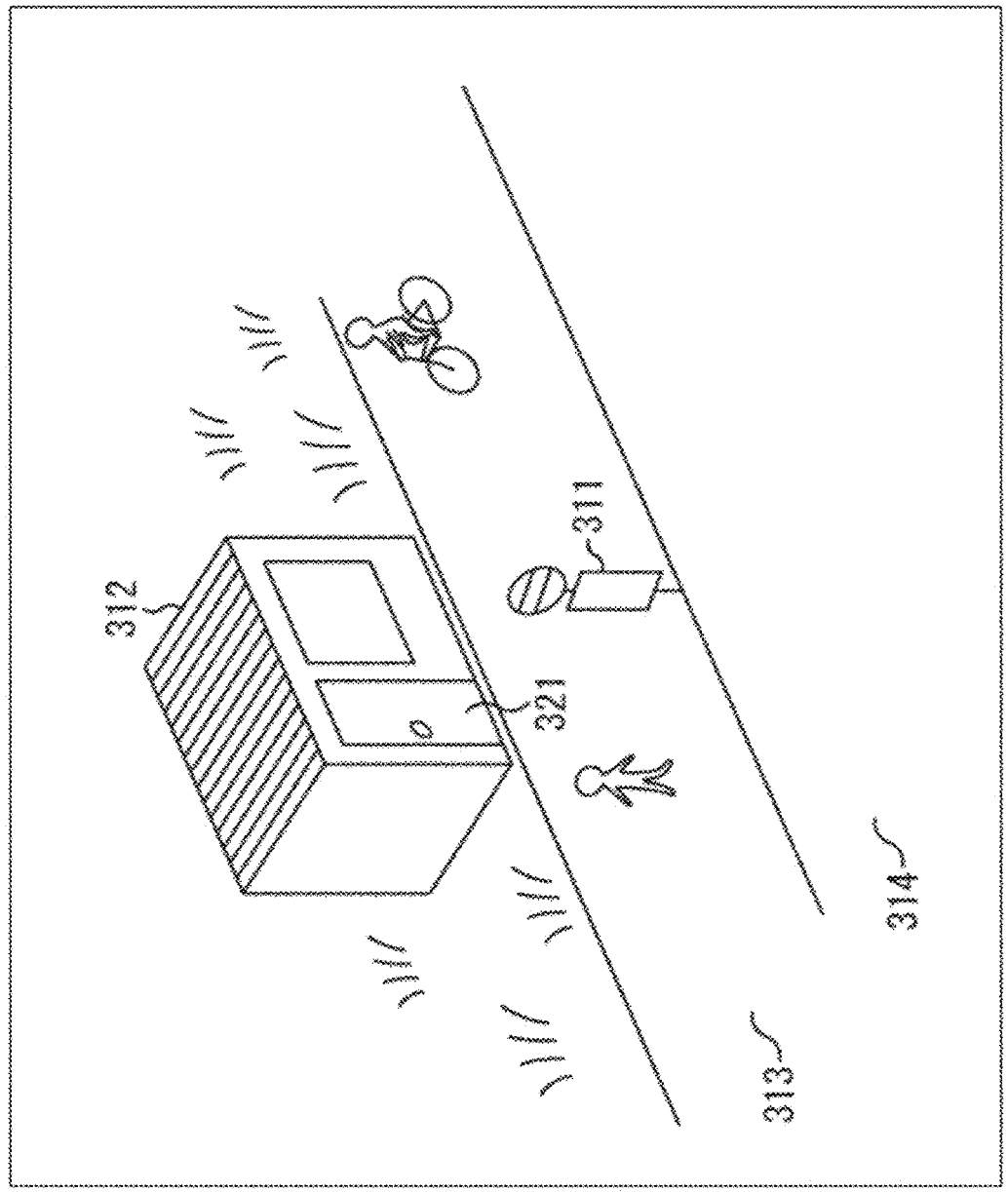
FIG. 9 is a diagram showing an example of a stop including a waiting room.

FIG. 8 and FIG. 9 show types of the stop.

For example, there is a stop where only a sign indicating the name of the stop, the timetable, and the like is installed. A sign 301 to a sign 303 in FIG. 8 are each an example of the sign of the stop. As shown in this example, there are various shapes of the sign.

Further, for example, there is a stop where a bus shelter provided with a roof for protecting against wind, rain, sunshine and the like is installed. A bus shelter 304 in FIG. 8 is an example thereof. Some bus shelters have a wall surface. Further, there is also a stop where a sign as well as a bus shelter are installed. Alternatively, there is also a stop where the name of the stop, the timetable, and the like are indicated in a bus shelter and no sign is installed.

Further, for example, there is a stop where a waiting room is installed. FIG. 9 shows an example of the stop where a waiting room is installed. In this example, a sign 311 is installed at the end of a sidewalk 313 on the side of a roadway 314. Further, a waiting room 312 is installed to face the sidewalk 313 on the side opposite to the roadway 314. The waiting room 312 is surrounded by a roof and a wall, and includes a door 321 for entering and leaving.

For example, the vehicle-exterior monitoring unit 171 holds in advance a pattern of the shape of a facility installed at a stop, such as a sign, a bus shelter, and a waiting room, and performs pattern recognition using the pattern to detect a stop in the vehicle-exterior image. Alternatively, for example, the vehicle-exterior monitoring unit 171 holds in advance a pattern of a mark (e.g., mark of a stop or bus company) attached to the sign, bus shelter, or the like, and performs pattern recognition using the pattern to detect a stop in the vehicle-exterior image. Alternatively, for example, the vehicle-exterior monitoring unit 171 detects a stop by recognizing the character representing the name of the next stop by character recognition or the like from the vehicle-exterior image.

Figure 10:
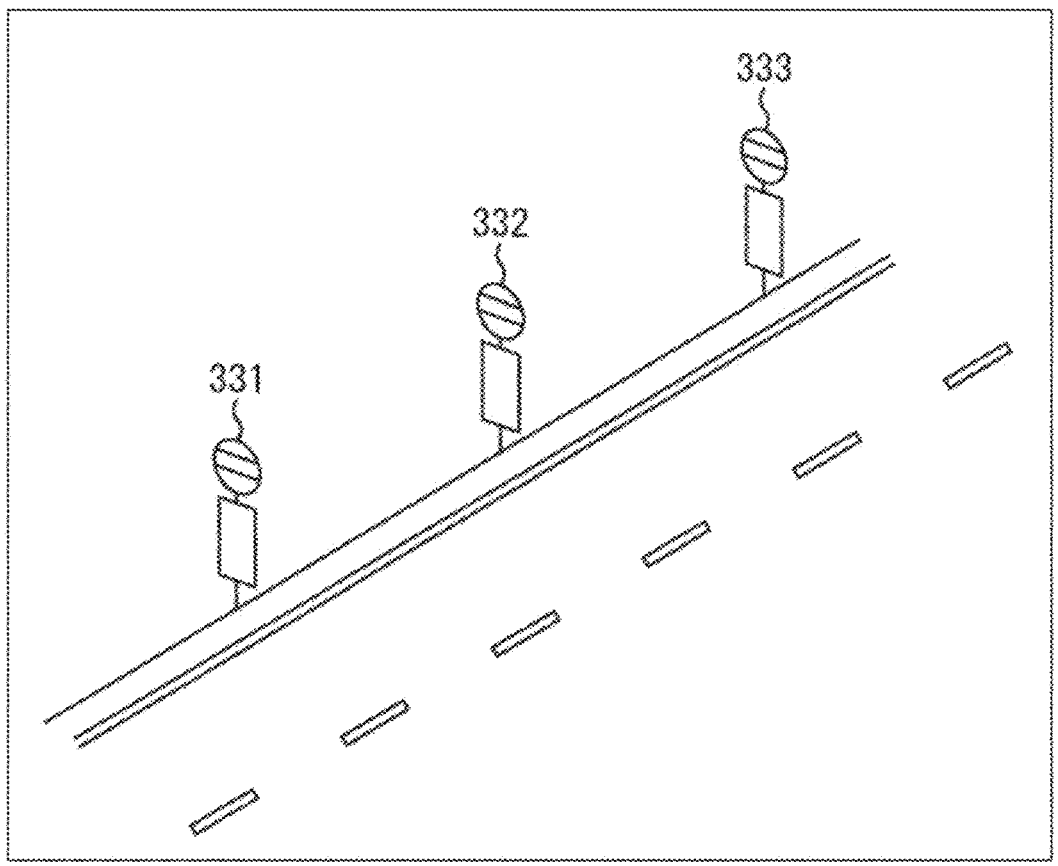
FIG. 10 is a diagram showing an example of a stop including a plurality of signs.

Further, in a bus terminal or the like where buses on a plurality of routes arrive and depart, the stop position of the bus differs for each route, and in some cases, a plurality of signs 331 to 333 are installed as shown in FIG. 10, for example. In this case, the vehicle-exterior monitoring unit 171 recognizes, from the sign 331 to the sign 333, the sign corresponding to the route of the bus 201. For example, the vehicle-exterior monitoring unit 171 recognizes the sign corresponding to the route of the bus 201 on the basis of preset information (e.g., position of the sign in the bus terminal), or recognizes the sign corresponding to the route of the bus 201 by character recognition or the like.

Note that the method of detecting the stop is not limited to the above-mentioned example, and an arbitrary method can be adopted. For example, a stop may be detected by supplementarily using the position information of the bus 201 and the map information. Alternatively, a stop may be detected by performing communication with the communication apparatus installed at the stop.

Next, the vehicle-exterior monitoring unit 171 sets the stop reference position on the basis of the detection result of the stop. The stop reference position represents a reference position where the bus 201 stops at the next stop, and processing of recognizing a candidate for getting on is performed for people around the stop reference position as will be described later.

For example, in the case where a sign is installed at the stop, the installation position of the sign is set to the stop reference position. Further, for example, in the case where a structure (hereinafter, referred to as the stop structure) for passengers waiting for a bus such as a bus shelter and a waiting room is installed at the stop, the stop reference position is set on the basis of the stop structure. For example, in the case where a bus shelter is installed, the area under the roof of the bus shelter is set to the stop reference position. Further, for example, in the case where the getting-on position (boarding position) is indicated at the stop, the getting-on position is set to the stop reference position.

Note that in the case where the stop includes two or more of the sign, the stop structure, and (display of) the getting-on position, for example, the stop reference position may be set on the basis of one of them or the stop reference position may be set on the basis of two or more positional relationships. In the case where setting is made on the basis of one of them, (display of) the getting-on position may be prioritized rather than the sign and the stop structure.

In Step S4, the vehicle-exterior monitoring unit 171 starts processing of recognizing a candidate for getting on. Here, the vehicle-exterior monitoring unit 171 performs, on the area in the vicinity of the stop candidate point, processing of recognizing a candidate for getting on. For example, the vehicle-exterior monitoring unit 171 sets the area of a high possibility that there is a passenger for waiting for a bus to an area (hereinafter, referred to as the priority recognition area) on which the processing of recognizing a candidate for getting on is preferentially performed, on the basis of the stop reference position set in the processing of Step S3.

Figure 11:
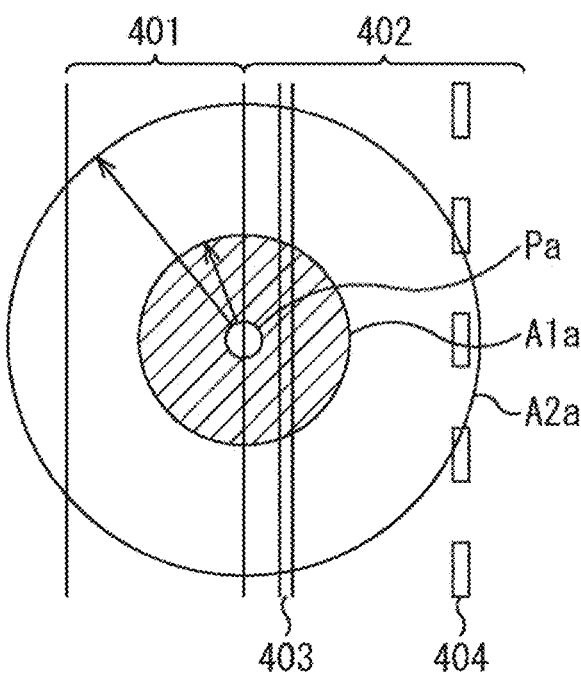
FIG. 11 is a diagram showing a first example of a priority recognition area.

FIG. 11 shows one typical example of the priority recognition area. In this example, a stop reference position Pa is installed in the vicinity of the boundary between a sidewalk 401 and a roadway 402. For example, the stop reference position Pa is the installation position of the sign (not shown) of the stop. Note that on the roadway 402, a roadway outside line 403 and a lane boundary line 404 are shown.

For example, the area within a predetermined radius around the stop reference position Pa is set to the priority recognition area. At this time, a plurality of priority recognition areas may be set in a stepwise manner. In the example of FIG. 11, two priority recognition areas of a priority recognition area A1a and a priority recognition area A2a are set. For example, the priority recognition area A1a is set to a circular area within a radius r1a around the stop reference position Pa. The priority recognition area A2a is set to a circular ring area within a radius r2a (> radius r1a) around the stop reference position Pa excluding the priority recognition area A1a.

The priority for performing the processing of recognizing a candidate for getting on is the highest in the priority recognition area A1a, the second highest in the priority recognition area A2a, and the lowest in the area outside the priority recognition area A2a. For example, the machine power, time, and the like allocated to the recognition processing is the largest in the priority recognition area A1a, the second largest in the priority recognition area A2a, and the lowest in the area outside the priority recognition area A2a. Accordingly, the recognition accuracy is the highest in the priority recognition area A1a, the second highest in the priority recognition area A2a, and the lowest in the area outside the priority recognition area A2a.

Note that an area outside the priority recognition area A1b may be excluded from the target for the processing of recognizing a candidate for getting on. That is, only in the priority recognition area A1a and the priority recognition area A1b, the processing of recognizing a candidate for getting on may be performed. In this case, a person outside the priority recognition area A1b is not recognized as the candidate for getting on.

Further, for example, in the case of using a score for determining whether or not he/she is a candidate for getting on, a person in the priority recognition area A1a may be given a higher score than a person the priority recognition area A1b, and a person in the priority recognition area A1b may be given a higher score than a person outside the priority recognition area A1b.

Figure 12:
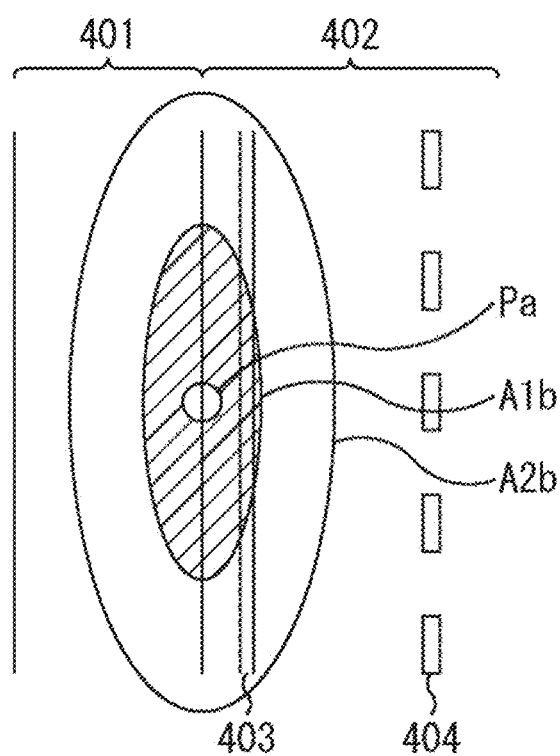
FIG. 12 is a diagram showing a second example of the priority recognition area.

Note that the priority recognition area does not necessarily need to be set to a concentric one. For example, as shown in FIG. 12, a priority recognition area A1b and a priority recognition area A2b may be set to have an elliptical outer circumference whose center is the stop reference position Pa.

Further, the position where a passenger waits for a bus changes depending on the configuration of the stop, the situation around the stop, and the like. Here, examples of the configuration of the stop include the presence/absence and position of a sign, the presence/absence, shape, and position of a stop structure such as a bus shelter and a waiting room, and the presence/absence and position of display of the stop position of the bus. Examples of the situation around the stop include the position, configuration, and accessory of the road around the stop, the position, type, and shape of a building or moving object around the stop, and the weather. Examples of the configuration of the road include the presence/absence or width of a sidewalk, the presence/absence or width of a shoulder, the width of a lane, and the number and position of road lane markings. Examples of the accessory of the road include a guardrail, a fence, a curb, and a road sign. Examples of the surrounding building include a building, a house, a wall, a fence, and a parking lot. Examples of the surrounding moving object include a parked vehicle.

In this regard, the vehicle-exterior monitoring unit 171 may set the priority recognition area further on the basis of at least one of the configuration of the stop, the situation around the stop (the stop reference position), and the like.

Figure 13:
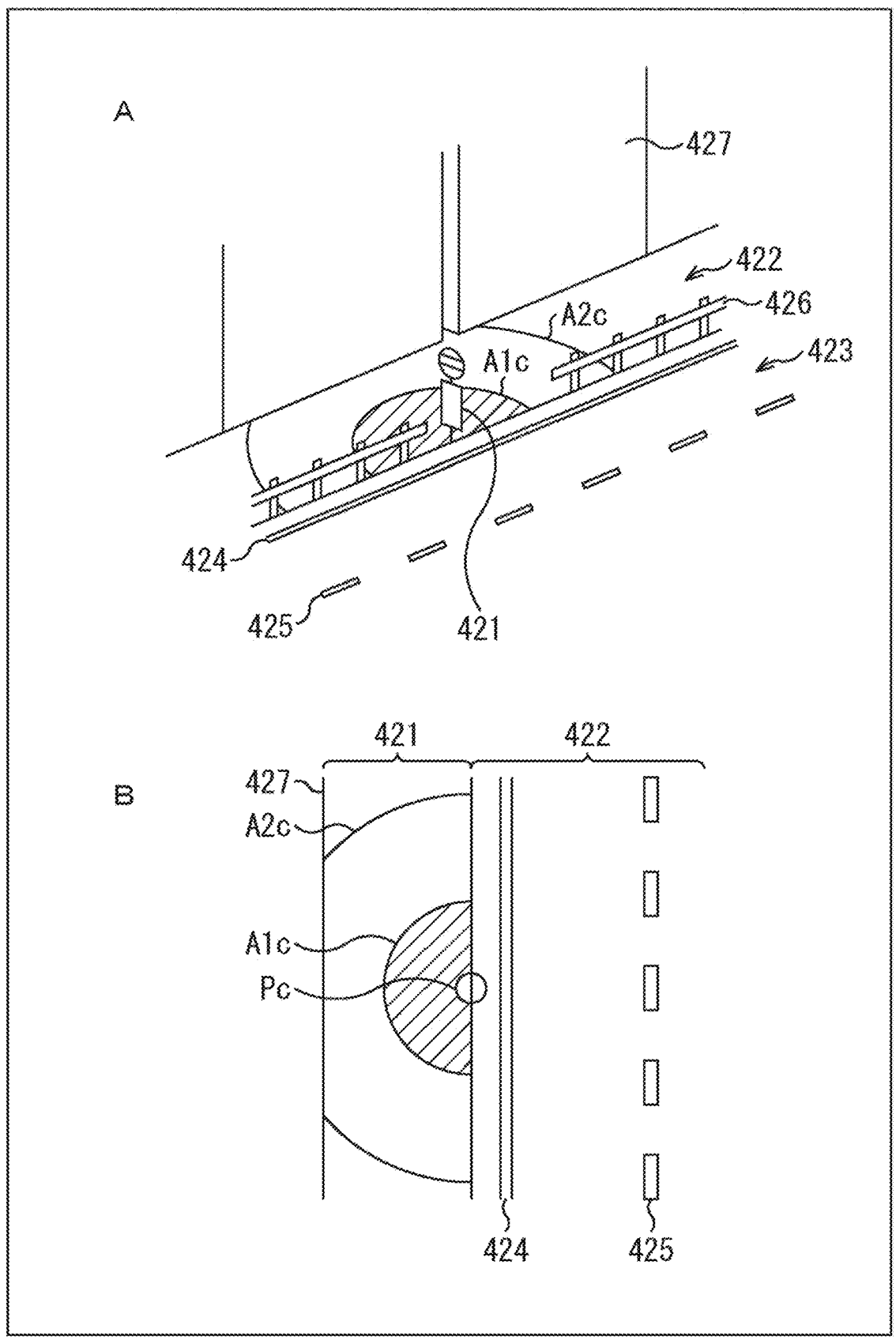
FIG. 13 is a diagram showing a third example of the priority recognition area.

For example, In the stop shown in Part A of FIG. 13, a sign 421 is installed in the vicinity of the boundary between a sidewalk 422 and a roadway 423. A guard rail 426 is installed at the end of the sidewalk 422 so as to face the roadway 423. On the roadway 423, a roadway outside line 424 and a lane boundary line 425 are shown. A building 427 faces the sidewalk 422.

In this case, as shown in Part B of FIG. 13, the position of the sign 421 is set to a stop reference position Pc. Further, basically, an area within a radius r1c around the stop reference position Pc is set to a priority recognition area A1c, and an area within a radius r2c (> radius r1c) around the stop reference position Pc excluding the priority recognition area A1c is set to a priority recognition area A2c. However, since the possibility that a passenger waiting for a bus enters the roadway 423 is assumed to be low due to the guardrail 426, the area within the roadway 423 is excluded from the priority recognition area. The area within the premises of the building 427 is excluded from the priority recognition area.

Figure 14:
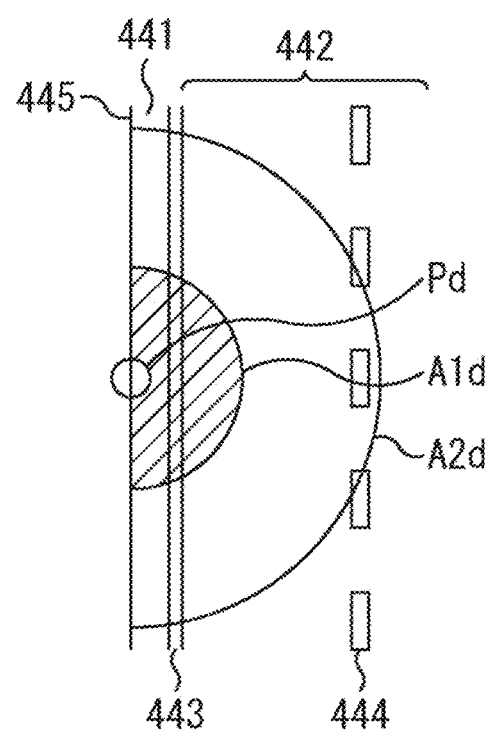
FIG. 14 is a diagram showing a fourth example of the priority recognition area.

FIG. 14 shows an example of the priority recognition area in a stop where no sidewalk is provided and a sign (not shown) is installed in a shoulder 441. Specifically, the shoulder 441 and a roadway 442 are separated by a roadway outside line 443. On the roadway 442, a lane boundary line 444 is shown. A fence 445 is installed so as to face the shoulder 441. The sign (not shown) is installed at the end of the shoulder 441 on the side of the fence 445, and a stop reference position Pd is set to this position.

In this case, for example, basically, an area within a radius rid around the stop reference position Pd is set to a priority recognition area Aid, and an area within a radius r2d (> radius rid) around the stop reference position Pd excluding the priority recognition area Aid is set to a priority recognition area A2d. However, the inner side (side opposite to the shoulder 441) of the fence 445 is excluded from the priority recognition area. Further, since the shoulder 441 is narrow and the possibility that a passenger waits for a bus in the roadway 442 is high, the area within the roadway 442 is not excluded and included in the priority recognition area.

Figure 15:
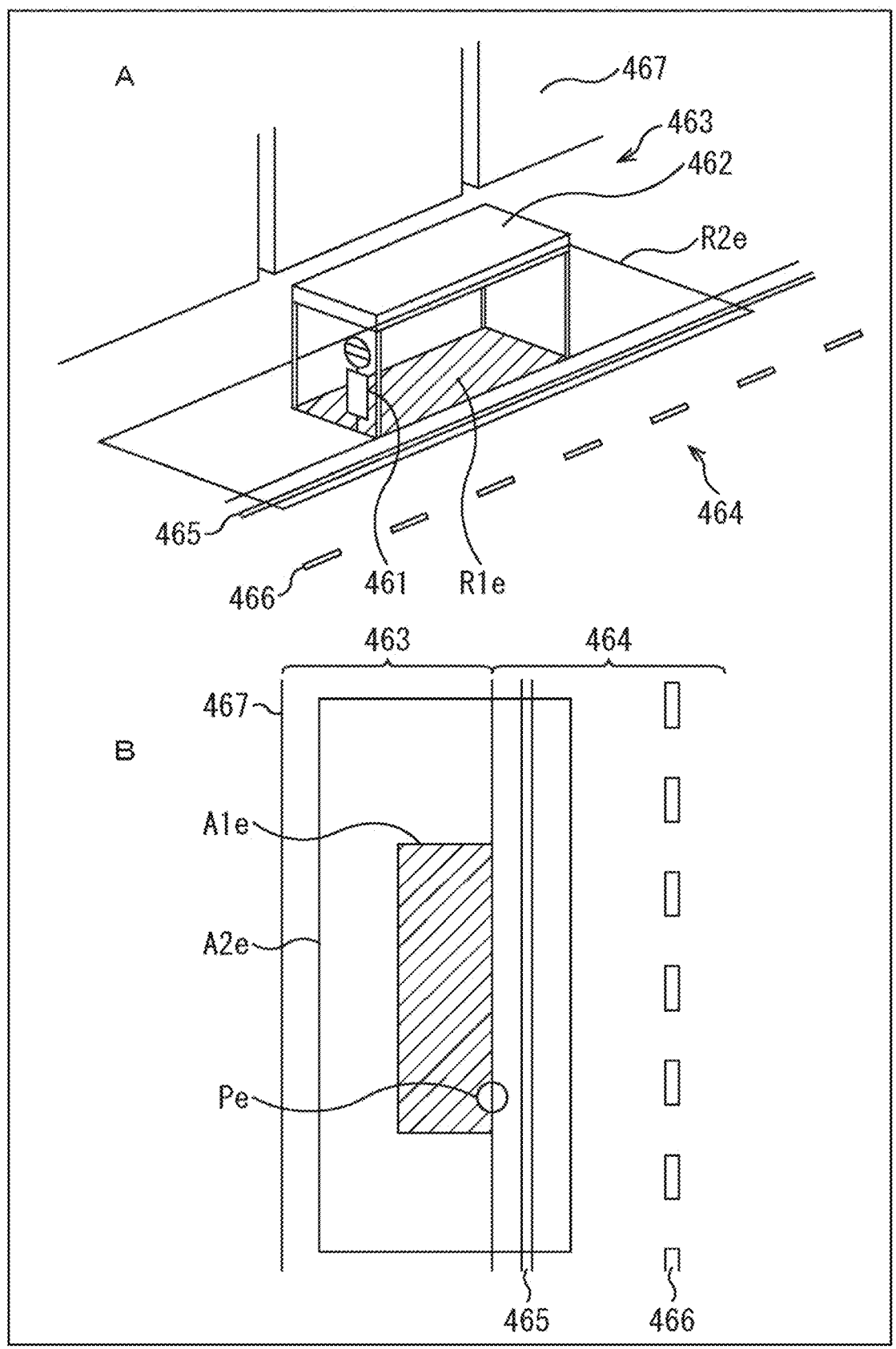
FIG. 15 is a diagram showing a fifth example of the priority recognition area.

In the stop shown in Part A of FIG. 15, a sign 461 and a bus shelter 462 are installed. Specifically, the bus shelter 462 is installed at the end of a sidewalk 463 on the side of roadway 464. The sign 461 is installed at the end on the front side of the bus shelter 462. On the roadway 464, a roadway outside line 465 and a lane boundary line 466 are shown. A building 467 faces the sidewalk 463.

In this case, as shown in Part B of FIG. 15, the position of the sign 461 is set to a stop reference position Pe. Further, the rectangular area in the bus shelter 462 is set to a priority recognition area A1e. Further, a rectangular frame area surrounding the priority recognition area A1e is set to a priority recognition area A2e.

In this example, since the width of the sidewalk 463 is wide, the priority recognition area A2e is not set up to the end of the sidewalk 463 on the side of the building 467. Further, since a guardrail or the like is provided and there is a possibility a passenger waiting for a bus enters the roadway 464, the area in the roadway 464 is not excluded from and included in the priority recognition area.

Next, the vehicle-exterior monitoring unit 171 recognizes a person in the vicinity of the stop by face recognition of the like on the basis of the vehicle-exterior image. Further, the vehicle-exterior monitoring unit 171 recognizes the position, the orientation of the line of sight, the behavior, and the like of the recognized person. Then, the vehicle-exterior monitoring unit 171 extracts a candidate for getting on among the recognized persons, on the basis of at least one of the recognition results of the position, the orientation of the line of sight, the behavior or the like of the person in the vicinity of the stop.

Note that as the recognition processing by the vehicle-exterior monitoring unit 171, arbitrary method can be adopted.

Figure 16:
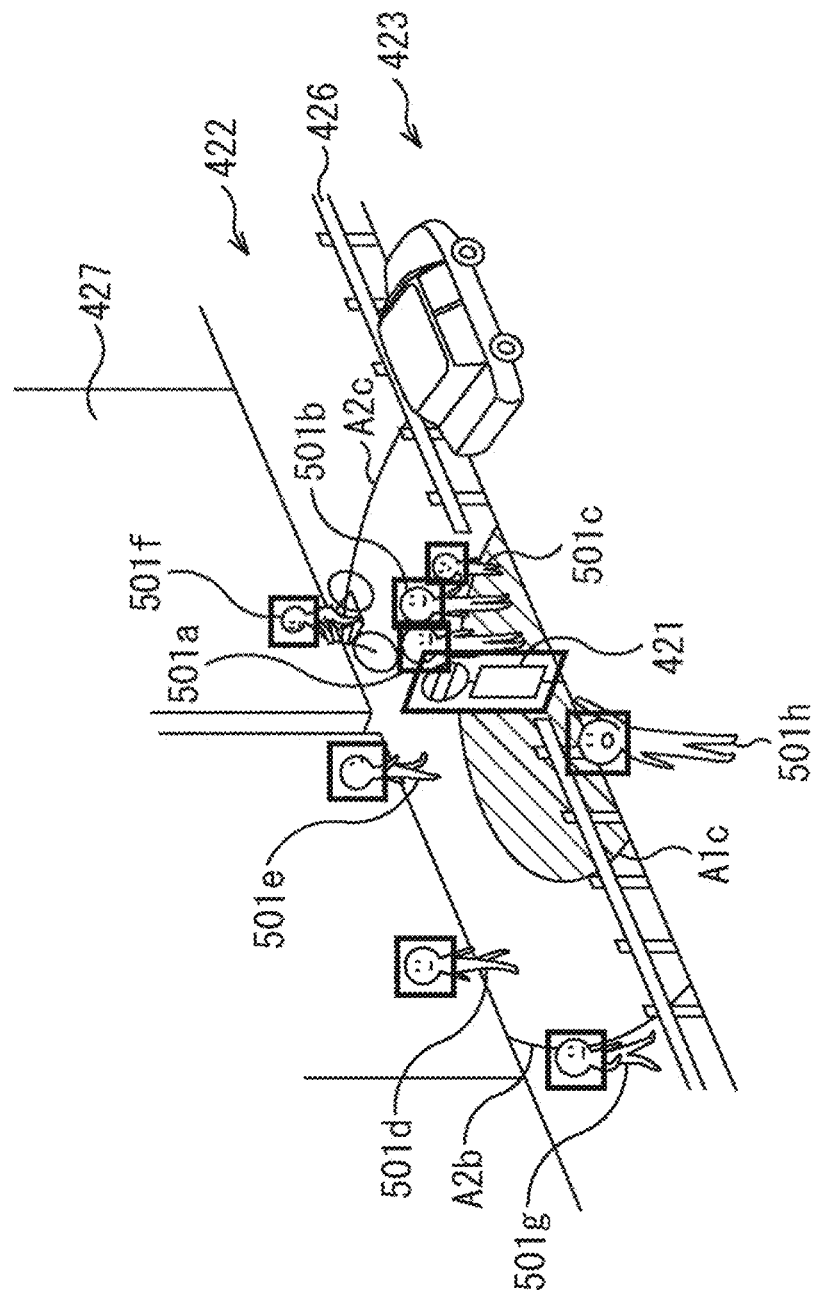

Now, a specific example of the processing of recognizing a candidate for getting on with reference to FIG. 16.

FIG. 16 shows an example of the recognition result of the person around the stop shown in Part A of FIG. 13. In this example, a person 501a to a person 501h are recognized. Note that in the figure, a frame is shown so as to surround the face of the recognized person.

The persons 501a to 501c stand in the vicinity of the sign 421 in the priority recognition area A1b. The person 501d and the person 501e are walking in a direction away from the stop in the priority recognition area A2c. The person 501f is riding in a bicycle in the priority recognition area A2c. The person 501g is walking on the sidewalk 422 outside the priority recognition area A2c in a direction approaching the stop. The person 501h is raising his/her hand while watching the direction of the bus 201, in the roadway 423 outside the priority recognition area A2c.

For example, the vehicle-exterior monitoring unit 171 excludes a person who is presumed not to be waiting for a bus obviously from the recognized persons. For example, the persons 501d and the person 501e each walking in a direction away from the stop, and the person 501f riding on a bicycle are excluded.

Next, the vehicle-exterior monitoring unit 171 gives, to each of the remaining persons, a score based on the position, the orientation of the line of sight, the behavior, and the like. For example, a person in the priority recognition area A1b is given a high score, and a person in the priority recognition area A2b is given the next highest score. Further, for example, a person running towards the stop is given a high score, and a person walking toward the stop is given the next highest score. Further, for example, a person watching the direction of the bus 201 is given a high score. Further, a person raising his/her hand toward the bus 201 is given a high score.

Note that for example, the vehicle-exterior monitoring unit 171 may change the score to be given, depending on the situation around the stop recognized by the situation recognition unit 162. For example, in the case of a stop including a bus shelter, it is assumed that the possibility that passengers wait in the bus shelter increases at the time of strong sunshine or bad weather such as rain and snow as compared with the other cases. In this regard, at the time of strong sunshine or bad weather, the vehicle-exterior monitoring unit 171 may increase the score to be given to a person in the bus shelter or reduce the score to be given to a person outside the bus shelter than usual.

Then, the vehicle-exterior monitoring unit 171 extracts a person having the total score of not less than a predetermined threshold value as a candidate for getting on. For example, in the example of FIG. 16, the person 501a to person 501c, and the person 501h are each recognized as a candidate for getting on.

Note that for example, the vehicle-exterior monitoring unit 171 may change the reference for recognizing a candidate for getting on, depending on the situation around the stop recognized by the situation recognition unit 162. For example, the vehicle-exterior monitoring unit 171 may reduce the threshold value than usual, in the situation where the recognition accuracy of a candidate for getting on is expected to decrease. That is, the reference for recognizing a candidate for getting on may be reduced. For example, in the case where the surroundings are dark at night, the visibility around the stop is poor due to rain, fog, snow, or the like, or the visibility around the stop is poor due to an obstacle such as another vehicle, the vehicle-exterior monitoring unit 171 may reduce the threshold value than usual.

Further, for example, in the case of a stop including a waiting room as in the above-mentioned stop shown in FIG. 9, there is a possibility that the inside of the waiting room becomes a blind spot from the bus 201 and passengers waiting in the waiting room cannot be recognized. In this regard, a camera may be provided in the waiting room and an image captured by the camera may be used for performing the processing of recognizing a candidate for getting on in the waiting room.

Figure 17:
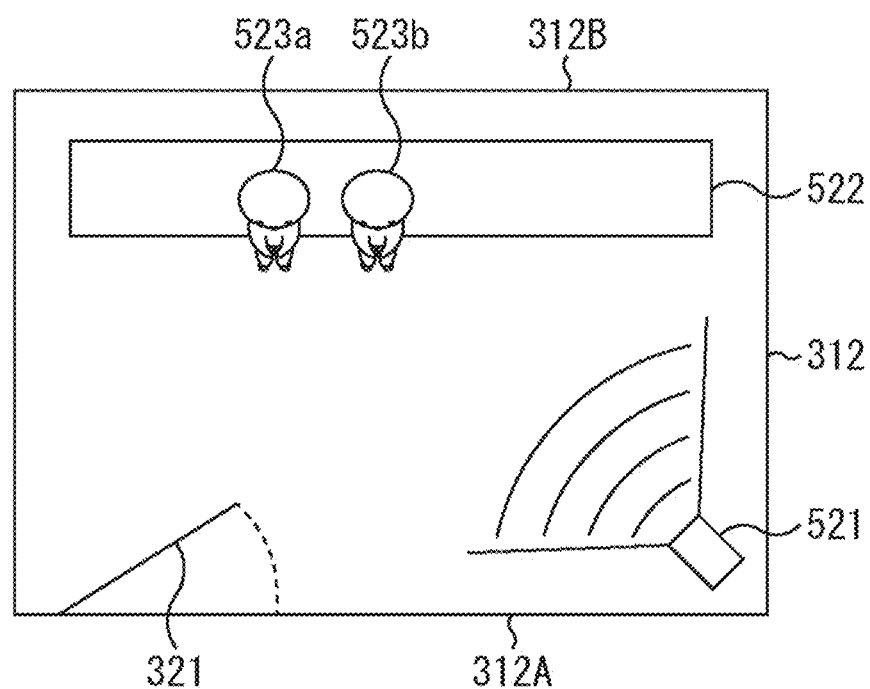

For example, FIG. 17 schematically shows a view of the interior of the waiting room 312 in FIG. 9 as viewed from above. A camera 521 is installed in the vicinity of the ceiling of the end, which is opposite to the door 321, of a wall 312A of the waiting room 312 on the side of the door 321 so that the entire interior can be imaged. Further, a bench 522 is placed in the vicinity of a wall 312B facing the wall 312A.

For example, when the communication unit 25 of the bus 201 approaches the waiting room 312, it communicates with the camera 521, and acquires an image captured by the camera 521. Then, the vehicle-exterior monitoring unit 171 recognizes, on the basis of the image received from the waiting room 312 via the communication unit 25, a person 523a and a person 523b sitting on the bench 522 as candidates for getting on.

Further, the vehicle-exterior monitoring unit 171 may perform the processing of recognizing a candidate for getting on using all the vehicle-exterior images or perform the processing of recognizing a candidate for getting on using a part of the vehicle-exterior images.

Further, the vehicle-exterior monitoring unit 171 may change the vehicle-exterior image to be used, between before the bus 201 stops (at the time of moving) and after the bus 201 stops (at the time of stopping). For example, as shown in Part A of FIG. 18, in the case where the bus 201 approaches a stop reference position 541 set on the boundary between a sidewalk 542 and a roadway 543, the vehicle-exterior monitoring unit 171 uses images captured by the camera 221F1, the camera 221F2 (not shown), and the camera 221L1 for performing, on the front direction and the obliquely left front direction of the bus 201, the processing of recognizing a candidate for getting on. That is, in the case where the bus 201 approaches the stop, the processing of recognizing a candidate for getting on is performed mainly on the vicinity of the stop in the travelling direction of the bus 201.

Figure 18:
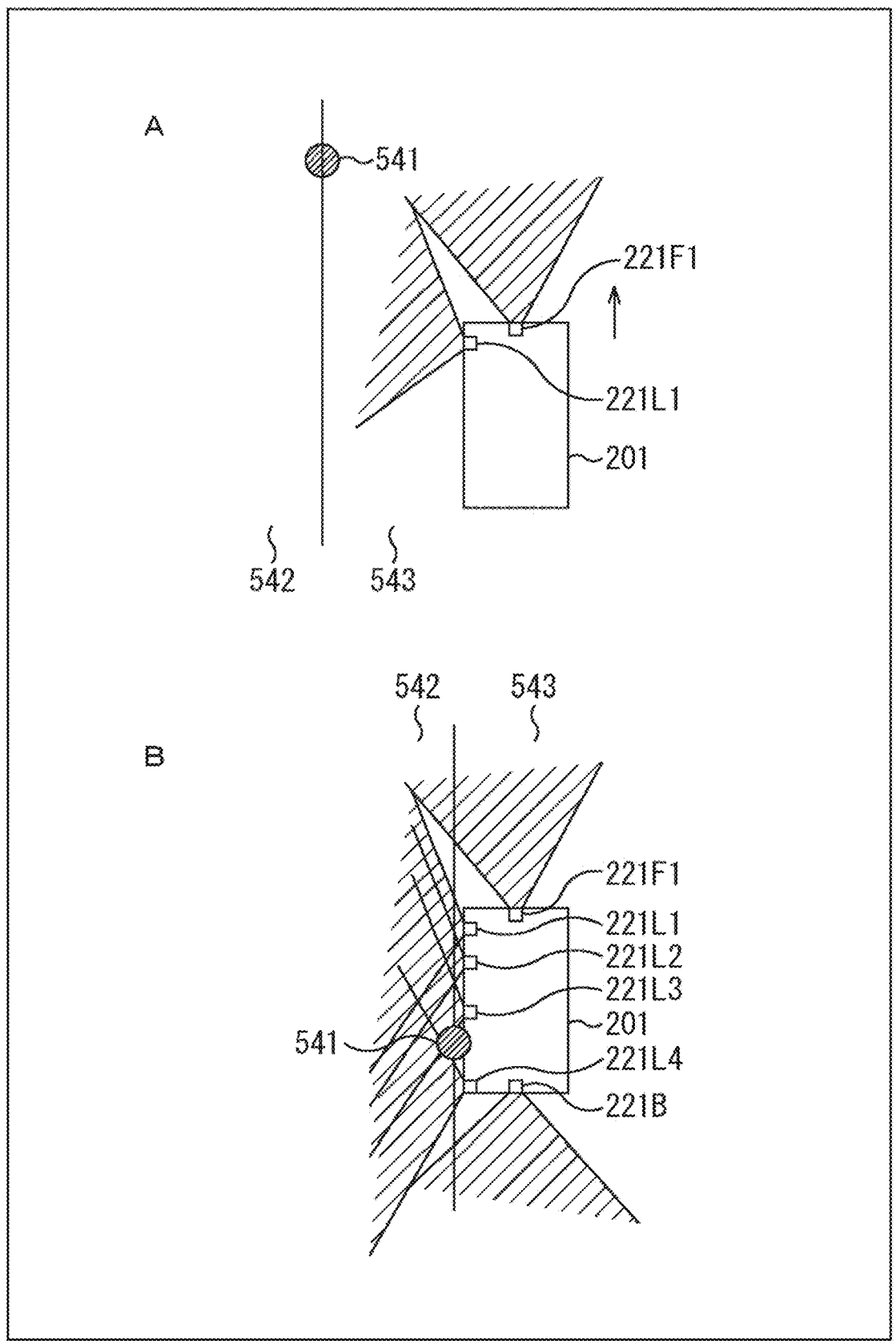

Meanwhile, as shown in Part B of FIG. 18, after the bus 201 stops at the stop, the vehicle-exterior monitoring unit 171 further adds images captured by the camera 221L2 to the camera 221L4 and the camera 221B, and adds the left side of the bus 201 and the rear side of the bus 201 as targets for recognizing a candidate for getting on. That is, after the bus 201 stops, the area to be recognized is widened so that a candidate for getting on who is around the bus 201 can be recognized more reliably and a passenger getting on the bus 201 and a passenger getting off the bus 201 can be recognized more reliably.

Accordingly, it is possible to more efficiently perform the processing of recognizing a candidate for getting on, the load of the recognition processing is reduced, and the recognition accuracy is improved.

Note that in this case, the imaging control unit 165 may perform control so that only a camera that captures an image used for the recognition processing performs imaging and other cameras stop imaging. That is, the imaging control unit 165 may change the camera that performs imaging between before and after the bus 201 stops. Accordingly, it is possible to reduce the power consumption.

Further, for example, before the bus 201 stops, the vehicle-exterior image to be used for the processing of recognizing a candidate for getting on may be switched or the camera that performs imaging may be switched, depending on the relative position between the bus 201 and the stop.

Returning to FIG. 6, in Step S5, the situation recognition unit 162 determines whether or not the appointed time has passed. Here, the appointed time represents, for example, the scheduled time to depart the next stop in the service schedule of the bus 201. In the case where it is determined that the appointed time has passed, the processing proceeds to Step S6.

In Step S6, the in-vehicle monitoring unit 172 determines whether or not there is a passenger to get off. For example, the in-vehicle monitoring unit 172 determines, in the case where a get-off button provided in the bus 201 has been pressed, that there is a passenger to get off, and determines, in the case where the get-off button has not been pressed, that there is no passenger to get off. Then, in the case where it is determined that there is no passenger to get off, the processing proceeds to Step S7.

Note that for example, the in-vehicle monitoring unit 172 may perform processing of recognizing a candidate for getting off to be described later, and determine, on the basis of the recognition result, whether or not there is a passenger to get off.

In Step S7, the vehicle-exterior monitoring unit 171 determines, on the basis of the result of the processing of recognizing a candidate for getting on, whether or not there is a candidate for getting on. In the case where it is determined that there is no candidate for getting on, the processing proceeds to Step S8.

In Step S8, the bus 201 passes the stop candidate point under the control of the driving control unit 163. That is, in the case where there is no passenger to get off and no candidate for getting on and the appointed time has passed, the bus 201 passes the stop candidate point (next stop) without stopping.

At this time, for example, the driving control unit 163 causes the bus 201 to slow down in the vicinity of the stop. Further, the UI control unit 166 controls the voice output apparatus or the like (not shown) to output an announcement indicating that is passes the stop. This makes it easier for a passenger in the bus 201 who have not noticed the approach to the stop where he/she gets off to notice the approach to the stop. Then, for example, in the case where the passenger presses the get-off button, processing similar to that in the case where it is determined that there is a passenger to get off in Step S6 to be described later is performed.

Further, since the bus 201 slows down in the vicinity of the stop, the recognition accuracy of a candidate for getting on by the vehicle-exterior monitoring unit 171 is improved. Further, for example, in the case where a passenger at a position a little away from the stop has not noticed the approach of the bus 201, it becomes easier for him/her to notice the approach of the bus 201. Then, the passenger takes an action for getting on, and thus, the vehicle-exterior monitoring unit 171 recognizes him/her as a new candidate for getting on in some cases. In the case where the presence of a candidate for getting on is recognized at this point, for example, processing similar to that in the case where it is determined that there is a candidate for getting on in Step S7 to be described later is performed.

Meanwhile, in the case where a candidate for getting on and the presence of a passenger to get off are not recognized and it has passed the stop, then, the driving control unit 163 accelerates the bus 201 up to the normal travelling speed.

In Step S9, the vehicle-exterior monitoring unit 171 stops the processing of recognizing a candidate for getting on. At this time, the imaging control unit 165 may stop the imaging by the camera that is not used for applications other than the processing of recognizing a candidate for getting on.

After that, the processing returns to Step S1, and the processing of Step S1 and subsequent Steps are executed.

Meanwhile, in the case where it is determined in Step S5 that the appointed time has not passed, there is a passenger to get off in Step S6, or it is determined in Step S7 that there is a candidate for getting on, the processing proceeds to Step S10.

In Step S10, the vehicle control unit 151 sets a stop candidate position. For example, the vehicle-exterior monitoring unit 171 performs, in the vicinity of the stop, processing of detecting display of the stop position of a bus, on the basis of the vehicle-exterior image. For example, the stop position of the bus is displayed by a rectangular frame or the like on the road surface of the lane (stop lane) in front of the stop. Then, in the case where the display of the stop position is detected, the stop position setting unit 164 sets the stop position to the stop candidate position.

Further, for example, in the case where the display of the stop position of the bus cannot be detected, the vehicle-exterior monitoring unit 171 performs detection of display of the getting-on position of passengers. Then, in the case where the display of the getting-on position of passengers is detected, the stop position setting unit 164 sets a stop candidate position so that the entrance door 213 of the bus 201 is located in the vicinity of the getting-on position.

Further, for example, in the case where the display of the stop position of the bus and the display of the getting-on position are not detected, the stop position setting unit 164 sets a stop candidate position on the basis of the stop reference position. For example, the stop position setting unit 164 sets a stop candidate position so that the entrance door 213 of the bus 201 is located in the vicinity of the stop reference position.

In Step S11, the vehicle-exterior monitoring unit 171 determines whether or not the vehicle is capable of stopping at the stop candidate position. For example, the vehicle-exterior monitoring unit 171 detects the presence/absence of an obstacle in the vicinity of the stop candidate position on the basis of the vehicle-exterior image. Here, the obstacle represents one that interferes with the stopping of the bus 201, and another vehicle, a person, and the like are assumed, for example. In the case where no obstacle is detected in the vicinity of the stop candidate position, the vehicle-exterior monitoring unit 171 determines that the vehicle is capable of stopping at the stop candidate position, and the processing proceeds to Step S12.

In Step S12, the bus 201 stops at the stop candidate position. Specifically, the stop position setting unit 164 sets the current stop candidate position to the stop position. Under the control of the driving control unit 163, the bus 201 gradually decelerates as it approaches the stop position, and stops at the stop position. Further, under the control of the driving control unit 163, the bus 201 opens the entrance door 213 and the exit door 214. Note that in the case where no candidate for getting on is recognized, it does not necessarily need to open the entrance door 213. Further, in the case where there is no person getting off, it does not necessarily need to open the exit door 214. Further, in the case where the bus 201 is capable of tilting the vehicle body for assisting getting on and off, the driving control unit 163 tilts the vehicle body of the bus 201. Further, the UI control unit 166 controls the voice output apparatus or the like (not shown) to output an announcement indicating that it has stopped at the stop.

After that, the processing proceeds to Step S14.

Meanwhile, the vehicle-exterior monitoring unit 171 determines, in the case where an obstacle is detected in the vicinity of the stop candidate position, that the vehicle cannot stop at the stop candidate position in Step S11, and the processing proceeds to Step S13. At this time, for example, the vehicle-exterior monitoring unit 171 may detect movement of a moving object such as a vehicle and a person around the stop candidate position, and determine, in the case where there is a possibility that the moving object enters the vicinity of the stop candidate position, that the vehicle cannot stop at the stop candidate position.

In Step S13, the bus 201 stops near the stop candidate position. For example, the stop position setting unit 164 sets a place where the vehicle is capable of avoiding the obstacle near the stop candidate position in the stop lane to the stop position. Under the control of the driving control unit 163, the bus 201 gradually decelerates as it approaches the stop position, and stops at the stop position. Then, similarly to the processing of Step S12, the driving control unit 163 opens the entrance door 213 and the exit door 214, and tilts the vehicle body. Further, the UI control unit 166 controls the voice output apparatus or the like (not shown) to output an announcement indicating that it has stopped at the stop.

After that, the processing proceeds to Step S14.

In Step S14, the in-vehicle monitoring unit 172 starts processing of recognizing a candidate for getting off. Specifically, the in-vehicle monitoring unit 172 uses the in-vehicle image for recognizing persons (passengers) inside the vehicle. Further, the in-vehicle monitoring unit 172 recognizes the position, behavior, and the like of each of the recognized passengers. Then, the in-vehicle monitoring unit 172 extracts, on the basis of at least one of the recognition results of the position, behavior, and the like of each of the recognized passenger, a candidate for getting off from the recognized passengers. For example, the in-vehicle monitoring unit 172 recognizes a passenger standing up from the seat, a passenger moving in the direction of the exit door 214, and the like as candidates for getting off.

Note that as the recognition processing by the in-vehicle monitoring unit 172, an arbitrary method can be adopted.

In Step S15, the monitoring unit 161 starts processing of recognizing getting on (boarding) of a candidate for getting on and getting off of a candidate for getting off.

For example, the vehicle-exterior monitoring unit 171 stores the face image of each candidate for getting on or the feature amount of the face. Further, the vehicle-exterior monitoring unit 171 performs face authentication of a passenger newly getting on the bus 201, by using the stored face image of each candidate for getting on or feature amount of the face, the image of the vicinity of the entrance door 213 captured by the camera 221L2, and the image captured by the in-vehicle camera 2211N. Then, in the case where there is a candidate for getting on, who has a face similar to the face of the newly getting-on passenger, the vehicle-exterior monitoring unit 171 removes the passenger from a candidate for getting on.

Further, for example, the in-vehicle monitoring unit 172 stores the face image of each candidate for getting off or the feature amount of the face. Further, the in-vehicle monitoring unit 172 performs face authentication of a passenger getting off the bus 201, by using the stored face image of each candidate for getting off or feature amount of the face, the image of the vicinity of the exit door 214 captured by the camera 221L3, and the image captured by the in-vehicle camera 2211N. Then, in the case where there is a candidate for getting off, who has a face similar to the face of the getting-off passenger, the vehicle-exterior monitoring unit 171 removes the passenger from a candidate for getting off.

Note that after starting the processing of recognizing getting on of a candidate for getting on, the vehicle-exterior monitoring unit 171 may stop the processing of recognizing a candidate for getting on and determine a candidate for getting on once.

Alternatively, also after starting the processing of recognizing getting on of a candidate for getting on, the vehicle-exterior monitoring unit 171 may continue the processing of recognizing a candidate for getting on and update the candidate for getting on. Accordingly, for example, the vehicle-exterior monitoring unit 171 is capable of newly recognizing a person approaching the entrance door 213 of the bus 201 late as a candidate for getting on, and removing the erroneously recognized candidate for getting on.

Similarly, after starting the processing of recognizing getting off of a candidate for getting off, the in-vehicle monitoring unit 172 may stop the processing of recognizing a candidate for getting off and determine a candidate for getting off once.

Alternatively, also after starting the processing of recognizing getting off of a candidate for getting off, the in-vehicle monitoring unit 172 may continue the processing of recognizing a candidate for getting off and update the candidate for getting off. Accordingly, for example, the in-vehicle monitoring unit 172 is capable of newly recognizing a person approaching the exit door 214 of the bus 201 late as a candidate for getting off, and removing the erroneously recognized candidate for getting off.

In Step S16, the situation recognition unit 162 determines whether or not it is before the appointed time. The determination processing of Step S16 is repeatedly executed until it is determined to be the appointed time or it is determined that it has passed the appointed time. Then, in the case where it is determined to be the appointed time or it is determined that it has passed the appointed time, the processing proceeds to Step S17.

In Step S17, the monitoring unit 161 determines whether or not a candidate for getting on or a candidate for getting off remains. The determination processing of Step S17 is repeatedly executed until it is determined that no candidate for getting on and no candidate for getting off remains. Then, in the case where it is determined that no candidate for getting on and no candidate for getting off remains, the processing proceeds to Step S18.

Note that in the case where the processing of recognizing a candidate for getting on is stopped after starting the processing of recognizing getting on of a candidate for getting on, the vehicle-exterior monitoring unit 171 may perform the processing of recognizing a candidate for getting on again just in case, after determining that no candidate for getting on remains. Further, in the case where the processing of recognizing a candidate for getting on is stopped after starting the processing of recognizing getting on of a candidate for getting on, the vehicle-exterior monitoring unit 171 may perform, when a candidate for getting on remains even after a predetermined time has elapsed, the processing of recognizing a candidate for getting on again, in preparation for a case where getting on of a candidate for getting on cannot be recognized due to erroneous recognition of a candidate for getting on.

Further, in the case where the processing of recognizing a candidate for getting off is stopped after starting the processing of recognizing getting off of a candidate for getting off, the in-vehicle monitoring unit 172 may perform the processing of recognizing a candidate for getting off just in case, after determining that no candidate for getting off remains. Further, in the case where the processing of recognizing a candidate for getting off is stopped after starting the processing of recognizing getting off of a candidate for getting off, the in-vehicle monitoring unit 172 may perform, when a candidate for getting off remains even after a predetermined time has elapsed, the processing of recognizing a candidate for getting off again, in preparation for a case where getting off of a candidate for getting off cannot be recognized due to erroneous recognition of a candidate for getting off.

Further, for example, the vehicle-exterior monitoring unit 171 may repeat the processing of recognizing a candidate for getting on without performing the processing of recognizing getting on of a candidate for getting on, and determine, when there is no candidate for getting on to be recognized, that no candidate for getting on remains. Similarly, the in-vehicle monitoring unit 172 may repeat the processing of recognizing a candidate for getting off without performing the processing of recognizing getting off of a candidate for getting off, and determine, when there is no candidate for getting off to be recognized, that no candidate for getting off remains.

In Step S18, the vehicle control unit 151 determines whether or not the vehicle is capable of departing. For example, the in-vehicle monitoring unit 172 detects the presence/absence of a passenger who is not seated, on the basis of the in-vehicle image. The driving control unit 163 determines, in the case where a passenger who is not seated is detected, that the vehicle is not capable of departing, and determines, in the case where a passenger who is not seated is not detected, that the vehicle is capable of departing. However, assuming a case of full occupancy or a case where there is a passenger standing without sitting, the driving control unit 163 determines, after a predetermined time (e.g., 30 seconds) has elapsed after no candidate for getting on and no candidate for getting off is detected, that the vehicle is capable of departing regardless of the presence/absence of the standing passenger, for example.

Then, in the case where it is determined that the vehicle is capable of departing, the processing returns to Step S17, and the processing of Step S17 and Step S18 is repeatedly executed until it is determined in Step S18 that the vehicle is capable of departing. Accordingly, a new passenger becomes capable of getting on or getting off the vehicle until the vehicle is capable of departing.

Meanwhile, in the case where it is determined in Step S18 that the vehicle is capable of departing, the processing proceeds to Step S19.

In Step S19, the bus 201 departs. Specifically, in the case where the vehicle body of the bus 201 is tilted, the driving control unit 163 returns the tilting of the vehicle body to its original state. Further, the driving control unit 163 closes the entrance door 213 and the exit door 214. Further, the UI control unit 166 controls the voice output apparatus or the like (not shown) to output an announcement indicating that the vehicle departures. Then, after the vehicle-exterior monitoring unit 171 confirms the surrounding security on the basis of the vehicle-exterior image, the bus 201 departs and gradually accelerates under the control of the driving control unit 163.

Note that the vehicle-exterior monitoring unit 171 may perform, immediately before or immediately after the bus 201 departures, processing of recognizing a passenger who have missed the bus 201. For example, in the case where there is a person who runs toward the bus 201, chases after the bus 201, or acts like he/she wants the bus 201 to wait for departure in the image of the rear of the bus 201, the vehicle-exterior monitoring unit 171 recognizes him/her as a passenger who has missed the bus 201. In the case where a passenger who has missed the bus 202 is recognized and the bus 201 has already departed, the driving control unit 163 stops the bus 201 when it is capable of stopping. Then, the driving control unit 163 delays the departure of the bus 201 until getting on the passenger who has missed the bus 202 is completed.

In Step S20, the monitoring unit 161 stops the processing of recognizing a candidate for getting on and a candidate for getting off. At this time, the imaging control unit 165 may stop the imaging by the camera that is not used for applications other than the processing of recognizing a candidate for getting on or a candidate for getting off.

After that, the processing returns to Step S1, and the processing of Step S1 and subsequent Steps is executed.

In this way, it is possible to appropriately perform automatic driving of the bus 201, in accordance with a person getting on the bus 201 or a person getting off the bus 201. That is, the bus 201 that performs automatic driving is capable of reliably stopping at the stop in accordance with the presence/absence of a passenger to get on and a passenger to get off. This allows the passenger to reliably get on the bus 201 and get off the bus 201 at a desired stop.

Further, the convenience of passengers on the bus 201 that performs automatic driving is improved. That is, the passenger only needs to wait at a stop, and is capable of reliably getting on the bus 201 without any special operation or the like.

2-3. Modified Example of First Embodiment

For example, in the case where it is determined in Step S5 that it has not passed the appointed time or it is determined in Step S6 that there is a passenger to get off, i.e., the bus 201 stops regardless of the presence/absence of a candidate for getting on, for example, the vehicle-exterior monitoring unit 171 may start, immediately before or after the bus 201 stops, the processing of recognizing a candidate for getting on.

Further, for example, in the case where the situation recognition unit 162 recognizes a situation where the recognition accuracy of a candidate for getting on is very low (e.g., dense fog), the bus 201 may stop at the next stop regardless of the presence/absence of a candidate for getting on or a passenger to get off.

Further, for example, in the case where it is recognized that there is a person in the priority recognition area having the highest priority, the bus 201 may stop at the stop regardless of the orientation of the line of sight, the behavior, and the like of the person.

Further, the priority recognition area can be set to one stage or three or more stages instead of the above-mentioned two stages.

Further, in the case where the next stop is the last stop, the vehicle-exterior monitoring unit 171 does not need to perform the processing of recognizing a candidate for getting on. Further, for example, in the case where the in-vehicle monitoring unit 172 recognizes that there is no passenger in the vehicle, the bus 201 may head to the next destination such as a garage without stopping at the last stop.

3. Second Embodiment

Next, a second embodiment of the present technology will be described. The second embodiment of the present technology is an embodiment in the case where the vehicle 11 is a taxi that performs automatic driving and the vehicle 11 automatically finds a passenger, stops, puts the passenger on, and departs.

Now, automatic stop/departure processing executed by the vehicle 11 will be described with reference to the flowchart of FIG. 19. Note that this processing is started when an ACC (accessory) power source of the vehicle 11 is turned on, and finished when the ACC power source is turned off, for example.

In Step S101, the vehicle-exterior monitoring unit 171 sets the priority recognition area. Here, the priority recognition area represents an area on which the processing of recognizing a candidate for getting on is preferentially performed as described above, and an area that is a predetermined area in a predetermined direction with respect to the vehicle 11 and has a person who is likely to ride on a taxi is set to the priority recognition area, for example.

For example, the vehicle-exterior monitoring unit 171 detects, on the basis of the vehicle-exterior image, a sidewalk or the like on the lane side on which the vehicle 11 travels in the travelling direction of the vehicle 11. Here, the sidewalk or the like represents, for example, a sidewalk or a shoulder. Note that strictly speaking, a roadway includes an area between a roadway outside line of a roadway on which a sidewalk is provided and a sidewalk (e.g., area between the sidewalk 401 and the roadway outside line 403 in FIG. 11). However, the area may be regarded as a sidewalk, because a pedestrian may pass through the area. Then, the vehicle-exterior monitoring unit 171 sets the detected sidewalk or the like to the priority recognition area.

In Step S102, the vehicle-exterior monitoring unit 171 performs the processing of recognizing a candidate for getting on. For example, the vehicle-exterior monitoring unit 171 recognizes a person in the priority recognition area by face recognition or the like, on the basis of the vehicle-exterior image. Here, the vehicle-exterior monitoring unit 171 may add the area around the priority recognition area as a recognition target, or limit the recognition target to only the priority recognition area. Further, the vehicle-exterior monitoring unit 171 recognizes the position, the orientation of the line of sight, the behavior, and the like of the recognized person. Then, the vehicle-exterior monitoring unit 171 extracts, from the recognized persons, a candidate for getting on, on the basis of at least one of recognitions results of the position, the orientation of the line of sight, the behavior, and the like of the recognized person.

For example, the vehicle-exterior monitoring unit 171 excludes a person who is presumed not to be waiting for a bus obviously from the recognized persons. For example, a walking person, a person riding on a bicycle, and the like are excluded.

Next, the vehicle-exterior monitoring unit 171 gives, to each of the remaining persons, a score based on the position, the orientation of the line of sight, the behavior, and the like. For example, a person in the priority recognition area, a person raising his/her hand, a person turning his/her line of sight in the direction of the vehicle 11, or the like is given a high score. Then, the vehicle-exterior monitoring unit 171 sets a person having the total score of not less than a predetermined threshold value to a candidate for getting on. At this time, the candidate for getting on may include two or more persons.

Note that for example, the vehicle-exterior monitoring unit 171 may perform the above-mentioned processing of recognizing a candidate for getting on the bus, and exclude the candidate for getting on the bus to recognize the candidate for getting on the taxi.

In Step S103, the vehicle-exterior monitoring unit 171 determines whether or not there is a candidate for getting on, on the basis of the result of processing of Step S102. In the case where it is determined that there is no candidate for getting on, the processing returns to Step S101.

After that, the processing of Step S101 to Step S103 is repeatedly executed until it is determined in Step S103 that there is a candidate for getting on.

Meanwhile, in the case where it is determined in Step S103 that there is a candidate for getting on, the processing proceeds to Step S104.

In Step S104, under the control of the driving control unit 163, the vehicle 11 approaches a candidate for getting on. At this time, the vehicle 11 slows down as necessary. Further, in the case where there are a plurality of candidates for getting on, the vehicle 11 approaches any of the plurality of candidates for getting on. For example, the vehicle 11 approaches the nearest candidate for getting on or candidate for getting on having the highest score.

In Step S105, the vehicle-exterior monitoring unit 171 specifies a candidate for getting on. For example, the vehicle-exterior monitoring unit 171 performs the processing of recognizing a candidate for getting on again. Then, the vehicle-exterior monitoring unit 171 specifies one person as a candidate for getting on from persons having the total score of not less than the predetermined threshold value. For example, the vehicle-exterior monitoring unit 171 specifies, as a candidate for getting on, the nearest person or the person having the highest score out of persons having the total score of not less than the predetermined threshold value. Further, in the case where there is a person near the specified candidate for getting on, who is estimated to accompany the specified candidate for getting on, the vehicle-exterior monitoring unit 171 adds the person to the candidate for getting on.

In Step S106, the vehicle-exterior monitoring unit 171 determines, on the basis of the result of the processing of Step S105, whether or not a candidate for getting on has been able to be specified. In the case where it is determined that a candidate for getting on has been able to be specified, e.g., there is no person having the total score of not less than the predetermined threshold value, the processing returns to Step S1. Note that at this time, in the case where the vehicle 11 is slowing down, it accelerates up to the normal travelling speed.

After that, the processing of Step S101 to Step S106 is repeatedly executed until it is determined in Step S106 that a candidate for getting on has been able to be specified.

Meanwhile, in the case where it is determined in Step S106 that a candidate for getting on has been able to be specified, the processing proceeds to Step S107.

In Step S107, under the control of the driving control unit 163, the vehicle 11 sends a signal to a candidate for getting on. For example, the vehicle 11 uses headlight flashing toward a candidate for getting on or sounds a car horn (klaxon).

Note that the processing of Step S107 may be omitted.

In Step S108, the vehicle-exterior monitoring unit 171 determines whether or not the vehicle is capable of stopping near the candidate for getting on. For example, the vehicle-exterior monitoring unit 171 detects, on the basis of the vehicle-exterior image, the presence/absence of an obstacle around the candidate for getting on. Here, the obstacle represents one that interferes with the stopping of the vehicle 11, and another vehicle, a person, and the like are assumed, for example. Further, for example, the vehicle-exterior monitoring unit 171 detects the presence/absence of an area where the vehicle cannot stop around the candidate for getting on. Here, the area where the vehicle cannot stop represents, for example, an area where stopping is explicitly prohibited (e.g., a no-stopping/parking area and a dedicated bus lane), a vicinity of an intersection, a pedestrian crossing, or the like.

In the case where there is no obstacle and no area where the vehicle cannot stop around the candidate for getting on, the vehicle-exterior monitoring unit 171 determines that the vehicle is capable of stopping near the candidate for getting on, and the processing proceeds to Step S109.

In Step S109, the vehicle 11 stops near the candidate for getting on. For example, the stop position setting unit 164 sets a stop position near the candidate for getting on. Under the control of the driving control unit 163, the vehicle 11 gradually decelerates as it approaches the stop position, and stops at the stop position. After that, the vehicle-exterior monitoring unit 171 confirms, on the basis of the vehicle-exterior image, the surrounding security, and then, the driving control unit 163 opens the door of the rear seat of the vehicle 11. Further, the driving control unit 163 opens the door of the passenger's seat and the door of the trunk of the vehicle 11 as necessary.

After that, the processing proceeds to Step S111.

Meanwhile, in the case where there is an obstacle or an area where the vehicle cannot stop around the candidate for getting on in Step S108, the vehicle-exterior monitoring unit 171 determines that the vehicle cannot stop near the candidate for getting on, and the processing proceeds to Step S110.

In Step S110, the vehicle 11 stops at a place a little away from the candidate for getting on. For example, the vehicle-exterior monitoring unit 171 detects a place where the vehicle 11 can stop, which is closest to the candidate for getting on, and the stop position setting unit 164 sets the place to the stop position. Under the control of the driving control unit 163, the vehicle 11 gradually decelerates as it approaches the stop position, and stops at the stop position. After that, the vehicle-exterior monitoring unit 171 confirms, on the basis of the vehicle-exterior image, the surrounding security, and then, the driving control unit 163 opens the door of the rear seat of the vehicle 11. Further, the driving control unit 163 opens the door of the passenger's seat and the door of the trunk of the vehicle 11 as necessary.

Note that at this time, for example, in the case where the set stop position is too far from the candidate for getting on, e.g., the distance between the set stop position and the candidate for getting on is not less than a predetermined threshold value, the vehicle 11 may pass as it is without stopping.

After that, the processing proceeds to Step S111.

Note that in the case where it is difficult for the vehicle 11 to stop at the set stop position due to the relationship or the like with a surrounding vehicle (e.g., following vehicle) in Step S109 and Step S110, it may pass as it is without stopping.

In Step S111, the vehicle-exterior monitoring unit 171 starts processing of recognizing getting on of a candidate for getting on. For example, the vehicle-exterior monitoring unit 171 stores the face image of each candidate for getting on or the feature amount of the face. Further, the vehicle-exterior monitoring unit 171 performs face authentication of a passenger newly getting on the vehicle 11, by using the stored face image of each candidate for getting on or feature amount of the face, the vehicle-exterior image, and the in-vehicle image. Then, in the case where there is a candidate for getting on, who has a face similar to the face of the newly getting-on passenger, the vehicle-exterior monitoring unit 171 removes the passenger from a candidate for getting on.

In Step S112, the driving control unit 163 determines whether or not the vehicle is capable of departing. For example, in the case where the vehicle-exterior monitoring unit 171 has not recognized getting on of all the candidates for getting on, the driving control unit 163 determines that the vehicle cannot depart, and the processing proceeds to Step S113.

In Step S113, the vehicle-exterior monitoring unit 171 determines whether or not erroneous recognition of a candidate for getting on occurs. In the case where it is determined that erroneous recognition of a candidate for getting on has not occurred, the processing returns to Step S112.

After that, the processing of Step S112 and Step S113 is repeatedly executed until it is determined in Step S112 that the vehicle is capable of departing or it is determined in Step S113 that erroneous recognition of a candidate for getting on has occurred.

Meanwhile, in the case where the vehicle-exterior monitoring unit 171 has recognized getting on of all the candidates for getting on in Step S112, the driving control unit 163 determines that the vehicle is capable of departing, and the processing proceeds to Step S114.

Further, for example, in the case where a candidate for getting on does not start getting on even when a predetermined time T1 has elapsed after the vehicle stops in Step S113, the vehicle-exterior monitoring unit 171 determines that erroneous recognition of a candidate for getting on has occurred, and the processing proceeds to Step S114.

Further, for example, in the case where getting on of all the candidates for getting on cannot be recognized even when a predetermined time T2 (> the time T1) has elapsed after the vehicle stops, the vehicle-exterior monitoring unit 171 determines the erroneous recognition of a candidate for getting on has occurred, and the processing proceeds to Step S114. Note that the time T2 is set to be longer than a standard time necessary for getting on, considering the time or the like taken for the passenger to put the luggage in the trunk.

In Step S114, the vehicle 11 departs. Specifically, the driving control unit 163 closes the door and the trunk of the vehicle 11. Then, the vehicle-exterior monitoring unit 171 confirms the surrounding security on the basis of the vehicle-exterior image, and then, the vehicle 11 departs and gradually accelerates under the control of the driving control unit 163.

After that, the automatic stop/departure processing is finished.

In this way, it is possible to appropriately perform automatic driving of a taxi in accordance with the passenger riding on the taxi (the vehicle 11). That is, the taxi that performs automatic driving is capable of automatically finding a passenger, stopping, putting the passenger on, and departing.

Further, the convenience of passengers on the taxi that performs automatic driving is improved. That is, the passenger only needs to perform the same operation as that in the case of riding on a taxi that does not perform automatic driving, and is capable of riding on a taxi that performs automatic driving.

Note that this automatic stop/departure processing is applicable to not only a taxi but also a moving object that passengers are capable of getting on at arbitrary places, which performs automatic driving in a transportation system. For example, a route bus or the like that performs automatic driving is assumed.

4. Third Embodiment

Next, a third embodiment of the present technology will be described. The third embodiment of the present technology is an embodiment in the case where the vehicle 11 is a taxi that performs automatic driving and the vehicle 11 automatically finds, when a candidate for getting on has made a reservation of dispatch by using application software that dispatches a taxi (hereinafter, referred to as the dispatch APP), for example, the candidate for getting on, stops, puts the candidate on, and departs.

Figure 20:
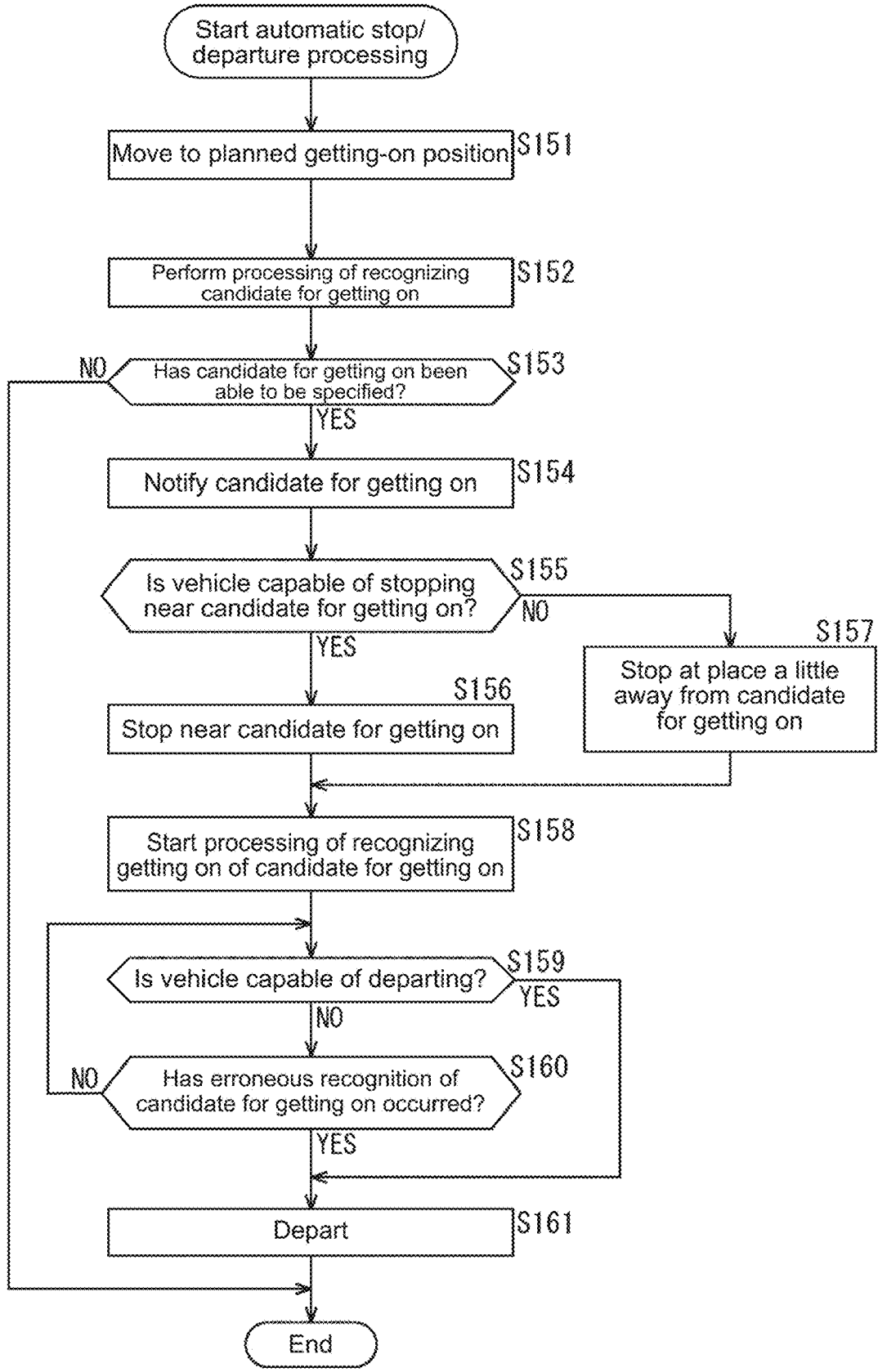
FIG. 20 is a flowchart for describing a third embodiment of the automatic stop/departure processing.

Here, the automatic stop/departure processing performed by the vehicle 11 will be described with reference to the flowchart of FIG. 20. Note that this processing is started when, for example, a candidate for getting on makes a reservation of taxi dispatch by using the dispatch APP in a portable terminal apparatus such as a smartphone, a tablet, and a mobile phone, and transmits information indicating the reservation content thereof (hereinafter, referred to as the dispatch reservation information), and the communication unit 25 of the vehicle 11 receives the dispatch reservation information via a network, a server, and the like.

The dispatch reservation information includes, for example, the current position of the candidate for getting on, the planned getting-on position, the planned getting-on time, and the planned number of persons to get on. Note that the current position of the candidate for getting on may be replaced with GPS (Global Positioning System) information received by GPS receiver provided in a portable terminal apparatus of a candidate for getting on. Further, in the case where the dispatch reservation information does not include the planned getting-on position, the current position of the candidate for getting on may be regarded as the planned getting-on position. Further, the dispatch reservation information may include, for example, a face image of the candidate for getting on or face feature amount data indicating the feature amount of the face of the candidate for getting on.

In Step S151, under the control of the driving control unit 163, the vehicle 11 moves to the planned getting-on position. At this time, in the case where the planned getting-on time is designated, the vehicle 11 moves to the planned getting-on position so as to be in time for the planned getting-on time.

In Step S152, the vehicle-exterior monitoring unit 171 performs the processing of recognizing a candidate for getting on. For example, in the case where the dispatch reservation information does not include the face image or face feature amount data of the candidate for getting on, the vehicle-exterior monitoring unit 171 performs the processing of recognizing a candidate for getting on, by processing similar to that of Step S102 in FIG. 19.

Meanwhile, in the case where the dispatch reservation information includes the face image or face feature amount data of the candidate for getting on, the vehicle-exterior monitoring unit 171 recognizes a person in the vehicle-exterior image. Then, the vehicle-exterior monitoring unit 171 recognizes a candidate for getting on, by checking (face authentication) the face image or face feature amount of the recognized person against the face image or face feature amount of a candidate for getting on included in the dispatch reservation information.

Note that the processing of recognizing a candidate for getting on is repeatedly executed a predetermined number of times or for a predetermined time even in the case where recognition of a candidate for getting on fails. Further, in the case where the planned getting-on time is set in the dispatch reservation information, the processing of recognizing a candidate for getting on is repeatedly executed until the planned getting-on time or a predetermined time after the planned getting-on time even in the case where recognition of a candidate for getting on fails.

In Step S153, the vehicle-exterior monitoring unit 171 determines, on the basis of the result of the processing of Step S152, whether or not a candidate for getting on has been able to be specified. In the case where it is determined that a candidate for getting on has been able to be specified, the processing proceeds to Step S154.

In Step S154, the vehicle 11 notifies the candidate for getting on. For example, the vehicle 11 notifies the candidate for getting on by sending a signal to the candidate for getting on, similarly to the processing of Step S107 in FIG. 19. Alternatively, for example, the communication unit 25 transmits a message notifying that it has arrived at the planned getting-on position to a portable terminal apparatus of the candidate for getting on via a network, a server, and the like.

Figure 19:
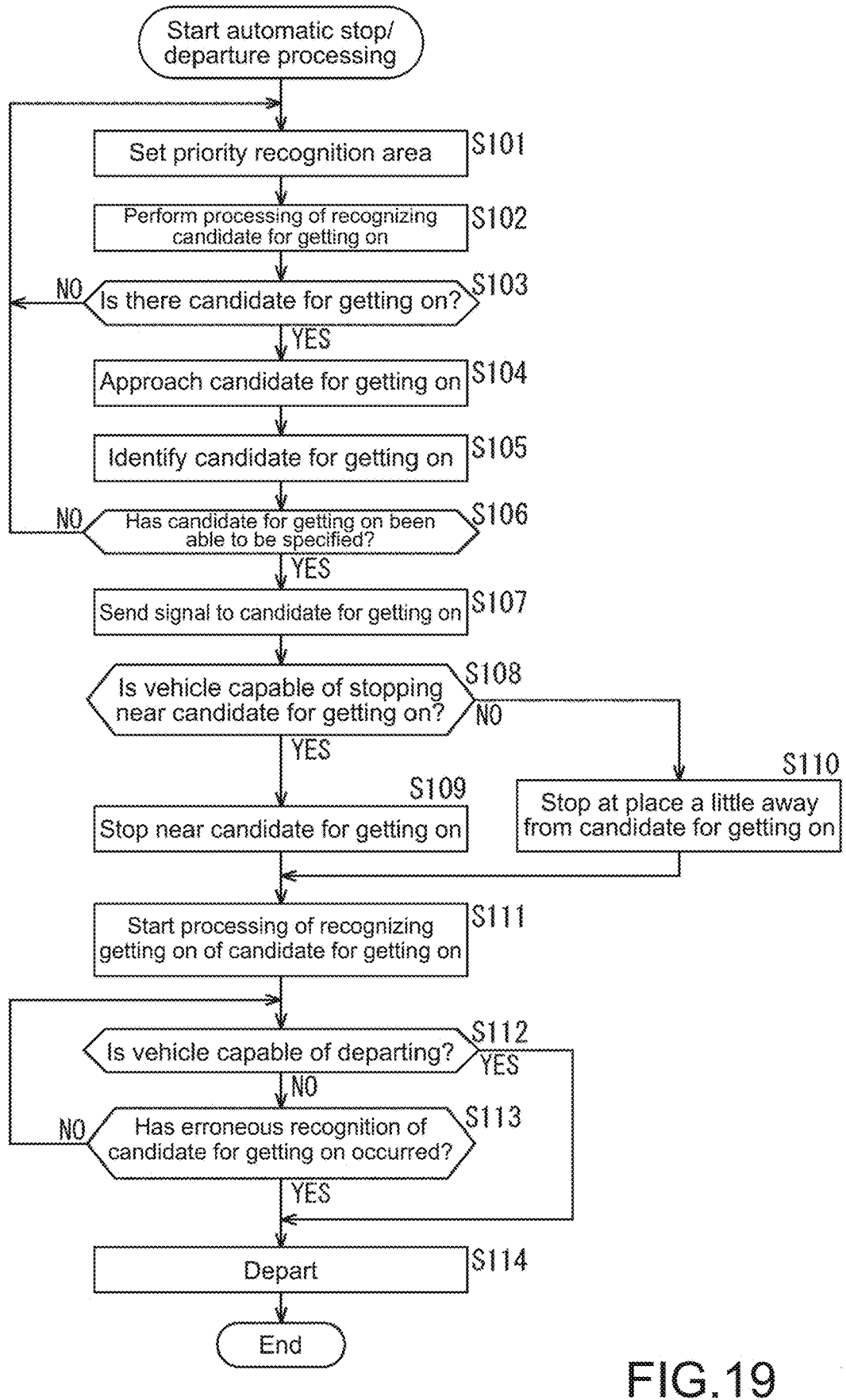
FIG. 19 is a flowchart for describing a second embodiment of the automatic stop/departure processing.

After that, processing similar to that of Step S108 to Step S114 in FIG. 19 is executed in Step S155 to Step S161, and the automatic stop/departure processing is finished.

Note that in Step S157, the vehicle 11 always stops even at a place away from the candidate for getting on unlike the above-mentioned processing of Step S110 in FIG. 19.

Further, in Step S158, in the case where the dispatch reservation information include the planned number of persons to get on, the vehicle-exterior monitoring unit 171 may perform processing of recognizing getting on of a candidate for getting on, by comparing the number of persons who have got on and the planned number of person to get on.

Meanwhile, in the case where it is determined in Step S153 that a candidate for getting on has not been able to be specified, the processing of Step S154 to Step S161 is omitted, and the automatic stop/departure processing is finished. That is, stopping and departure of the vehicle 11 are not performed.

Note that in the case where a candidate for getting on has not been able to be specified, for example, the communication unit 25 may transmit a message notifying that a candidate for getting on has not been able to be found to a portable terminal apparatus of the candidate for getting on via a network, a server, and the like. After that, the vehicle 11 may specify a candidate for getting on while performing communication with the candidate for getting on.

This automatic stop/departure processing is applicable to not only a taxi but also a case of automatically picking up a reserved/registered candidate for getting on.

For example, it is applicable to a case where a private car that performs automatic driving automatically picks up a reserved/registered candidate for getting on. For example, an owner or the like of the private car registers the face image or face feature amount data of a candidate for getting on to be picked up, in the vehicle 11 or a server capable of communicating with the vehicle 11 in advance. Note that as the candidate for getting on, for example, the owner of the vehicle 11, and the family member, relative, acquaintance, friend, and the like of the owner are assumed. Then, the vehicle 11 recognizes the registered candidate for getting on by the above-mentioned processing using the face image or face feature amount data, and picks up the recognized candidate for getting on.

Further, for example, also in the case of a route bus, a reservation of getting on may be made in advance, the face image or face feature amount data may be transmitted to the bus or a server or the like capable of communicating with the bus, and the bus may perform the processing of recognizing a candidate for getting on by using face authentication.

5. Fourth Embodiment

Next, a fourth embodiment of the present technology will be described.

Note that in the following description, unless otherwise distinguished, the vehicle 11 includes the above-mentioned bus 201.

Although the case where the present technology is applied to the case where the vehicle 11 performs automatic driving has been described above as an example, the present technology is applicable to also a case where the vehicle 11 performs semi-automatic driving.

For example, the vehicle 11 may automatically stop as described above, and depart by the driver's operation.

Further, for example, in the case where a candidate for getting on has been recognized, the vehicle 11 may automatically decelerate and then slow down, and the final stop decision may be made by the driver.

Further, for example, in the case where the vehicle 11 performs semi-automatic driving, a screen that notifies the recognition result or the like of a candidate for getting on (hereinafter, referred to as the assist screen) may be presented to the driver to assist the driving. The assist screen is displayed on the display unit 24 of the vehicle 11 under the control of the UI control unit 166, for example.

FIG. 21 to FIG. 24 schematically shows an example of the assist screen.

Figure 21:
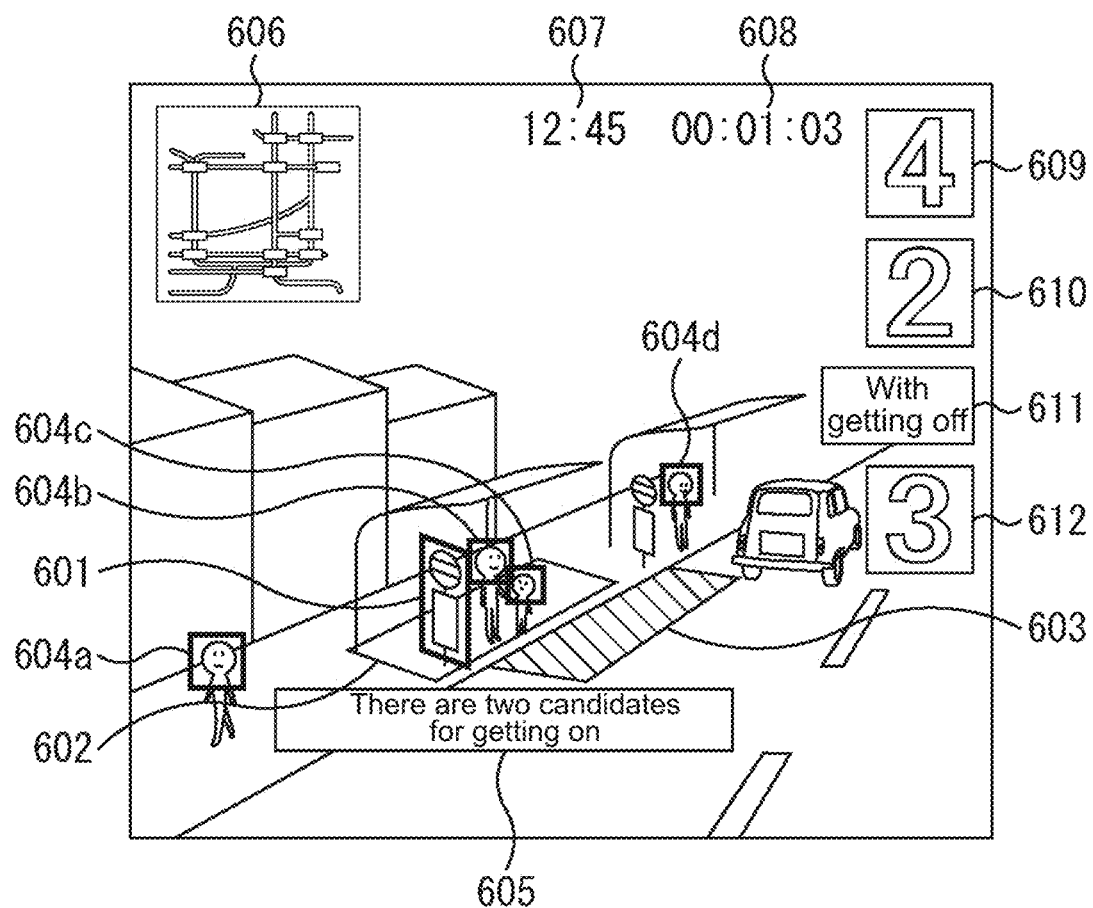
FIG. 21 is a diagram showing a first example of an assist screen.

FIG. 21 shows an example of the assist screen presented to the driver in the case where a bus approaches a stop.

On the assist screen in FIG. 21, some pieces of information are superimposed on the image of the front of the bus. Specifically, a frame 601 indicating the position of a sign of a stop is displayed. A frame 602 indicating the priority recognition area is displayed. A frame 603 indicating the stop position is displayed. Frames 604a to 604d surrounding faces of recognized persons are displayed. Note that by changing the design, color, or the like of the frames 604a to 604d between a candidate for getting on and other persons, the candidate for getting on and other persons may be distinguished with each other.

Further, at the bottom of the screen, a message 605 indicating that there is a candidate for getting on is displayed. At the upper left corner of the screen, a route map 606 of the bus is displayed. At the central upper end of the screen, a current time 607 is displayed. On the right side of the current time 607, a remaining time 608 to the time when it should arrive at the stop is countdown-displayed. At the upper right corner of the screen, a numerical number 609 indicating the number of persons recognized around the stop is displayed. Under the numerical number 609, a numerical number 610 indicating the number of recognized candidates for getting on is displayed. Under the numerical number 609, a message 611 indicating the presence/absence of a passenger to get off is displayed. Under the message 611, a numerical number 612 indicating number of vacant seats is displayed.

With this assist screen, the driver is capable of reliably recognizing the stop and the stop position. Further, the driver is capable of reliably recognizing the presence/absence, number, and positions of candidates for getting on. Further, the driver is capable of reliably recognizing the presence/absence of a person to get off and the number of vacant seats.

Figure 22:
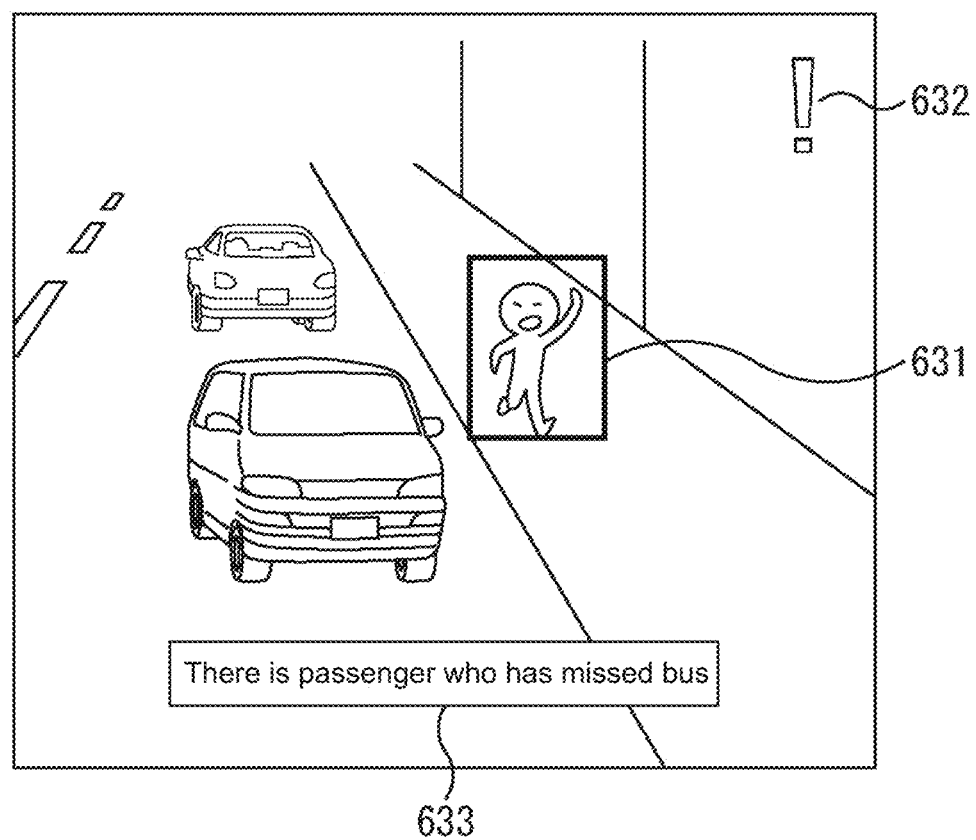
FIG. 22 is a diagram showing a second example of the assist screen.

FIG. 22 shows an example of the assist screen presented to the driver immediately after the bus departs the stop.

On the assist screen in FIG. 22, the image of the rear of the bus is displayed, and some pieces of information are superimposed on the displayed image. Specifically, a frame 631 surrounding a candidate for getting on, who is recognized as a passenger who has missed the bus because he/she is running toward the bus, is displayed. At the upper right corner of the screen, a mark 632 for calling attention to the driver is displayed. At the lower center of the screen, a message 633 indicating the there is a passenger who has missed the bus is displayed.

Accordingly, the driver is capable of reliably recognizing that there is a passenger who has missed the bus.

Note that for example, in addition to the assist screen in FIG. 22, it may be possible to notify that there is a passenger who has missed the bus by sound such as an alarm. Further, for example, under the control of the driving control unit 163, the vehicle 11 may automatically slow down to urge the driver to stop.

Figure 23:
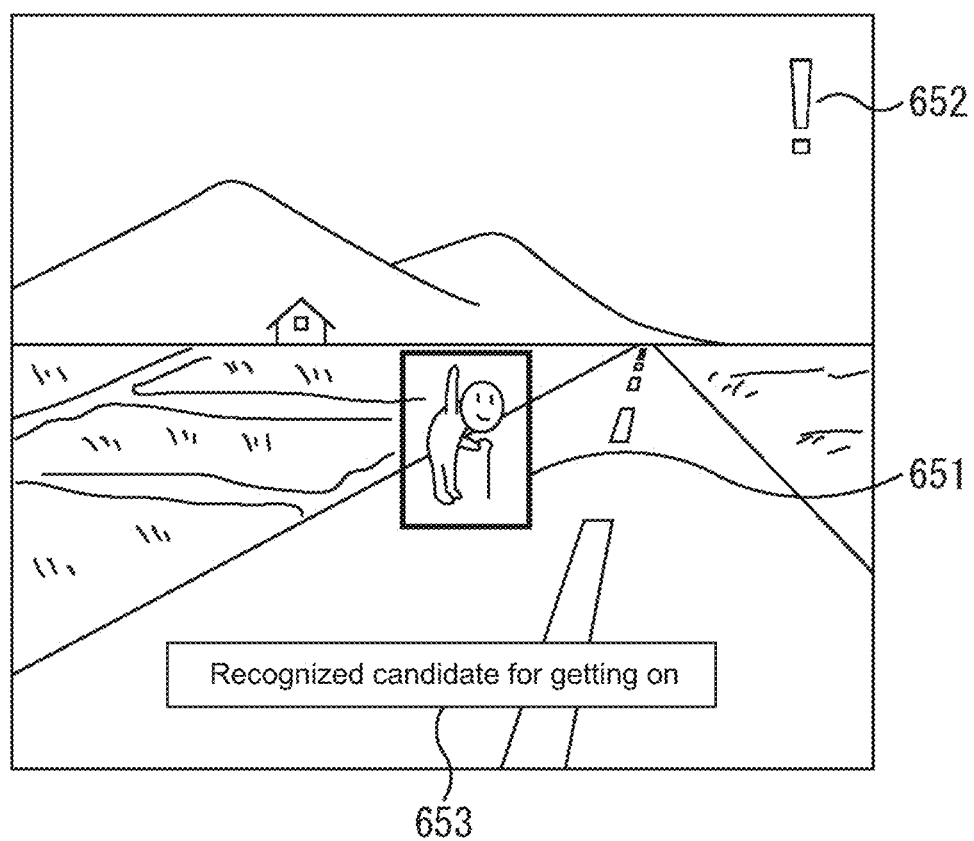
FIG. 23 is a diagram showing a third example of the assist screen.

FIG. 23 shows an example of the assist screen presented to the driver in a bus or taxi that passengers are capable of getting on at arbitrary places.

On the assist screen in FIG. 23, the image of the front of the vehicle is displayed, and some pieces of information are superimposed on the displayed image. Specifically, a frame 651 surrounding a candidate for getting on, who has been recognized because he/she is raising his/her hand facing the vehicle, is displayed. At the upper right corner of the screen, a mark 652 for calling attention to the driver is displayed. At the lower center of the screen, a message 653 indicating that a candidate for getting has been recognized on is displayed.

Accordingly, the driver is capable of reliably recognizing that there is a candidate for getting on.

Note that for example, in addition to the assist screen in FIG. 23, it may be possible to notify that there is a candidate for getting on by sound such as an alarm. Further, for example, under the control of the driving control unit 163, the vehicle 11 may automatically slow down to urge the driver to stop.

Figure 24:
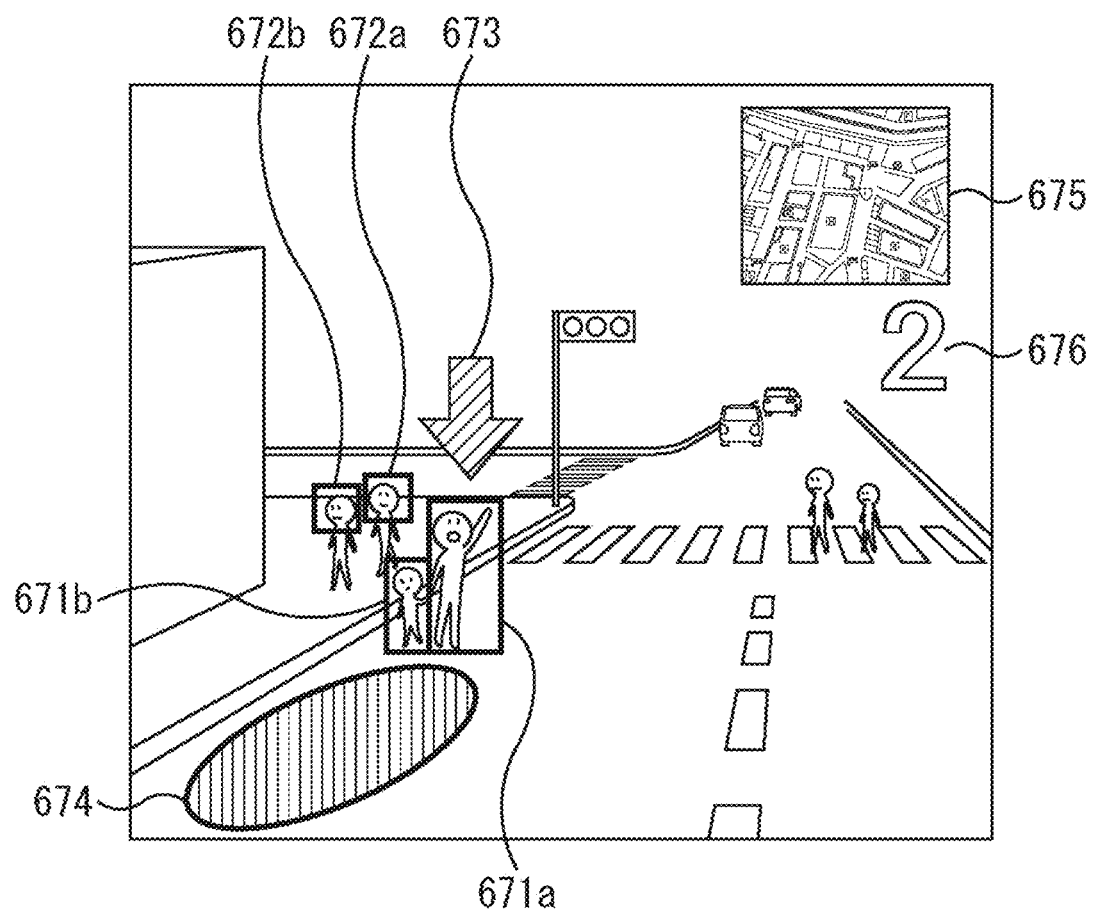
FIG. 24 is a diagram showing a fourth example of the assist screen.

FIG. 24 shows an example of the assist screen presented to the driver of a taxi.

On the assist screen in FIG. 24, some pieces of information are superimposed on the image of the front of the taxi. Specifically, a frame 671*a* and a frame 671*b* surrounding the whole body of candidates for getting on out of persons recognized in the priority recognition area are displayed. Further, a frame 672*a* and a frame 672*b* surrounding faces of persons other than the candidates for getting on out of persons recognized in the priority recognition area are displayed. Further, an arrow 673 indicating the position of the candidate for getting on is displayed. Accordingly, it is possible to easily recognizing the candidate for getting on from the assist screen.

Note that since persons walking on a pedestrian crossing are located away from the priority recognition area and not recognized, a frame for the persons is not displayed.

Further, a frame 674 indicating the stop position is displayed on the road surface before the candidates for getting on. Accordingly, the driver is capable of stopping the vehicle 11 at a position suitable for picking up the candidates for getting on.

Further, at the upper right corner of the screen, a map 675 is displayed. Under the map 675, a numerical number 676 indicating the number of candidates for getting on is displayed.

With this assist screen, the driver is capable of reliably recognizing the presence of a candidate for getting on. Further, the driver is capable of reliably recognizing the number and position of candidates for getting on.

Note that for example, in the case where the display unit 24 is a transmissive display superimposed and provided on a windshield part, for example, the assist screen in FIG. 23 and FIG. 24 can be realized by superimposing information on the field of view (e.g., real world outside the vehicle 11 seen from the windshield) of an occupant of the vehicle 11 by AR (augmented reality) or the like.

Further, the assist screen in FIG. 21 to FIG. 24 is applicable to a vehicle that does not perform automatic driving and semi-automatic driving.

6. Modified Example

Hereinafter, a modified example of the above-mentioned embodiment of the technology according to the present disclosure will be described.

For the processing of recognizing a candidate for getting on, an image captured at a place other than that of the vehicle 11, such as the image captured by the camera of the waiting room of the stop described above, can be used. For example, an image captured by a camera provided in a sign of the stop, a surveillance camera provided in an urban area, or the like is assumed. Further, for example, the processing of recognizing a candidate for getting on may be performed by a camera outside the vehicle 11 or a system including the camera, and the vehicle 11 may acquire the result of the recognition processing.

Further, it is desirable to delete the face image or face feature amount data of the passenger used by the vehicle 11, for privacy protection. For example, immediately after getting on or getting off of a passenger is recognized, the face image or face feature amount data of the passenger may be deleted.

Alternatively, for example, after a predetermined time has elapsed from when getting on or getting off of a passenger is recognized, the face image or face feature amount data of the passenger may be deleted. Accordingly, for example, in the case where the passenger has come to pick up the lost item or the like, it is easy to confirm whether or not the passenger has actually gotten on.

Further, although the example in which the bus 201 performs both of the processing of recognizing a candidate for getting on and the processing of recognizing a candidate for getting off has been described above, only one of them may be performed. Similarly, the bus 201 may perform only one of the processing of recognizing getting on of a candidate for getting on and the processing of recognizing getting off of a candidate for getting off.

Further, an example in which the vehicle 11 that is a taxi performs the processing of recognizing a candidate for getting off and the processing of recognizing a candidate for getting off has not been described above, these processes may be performed. This is effective, for example, when the getting-off position differs for each passenger as in a route taxi.

Further, the vehicle 11 may determine, in the case where the passenger gets off the vehicle 11, whether or not the getting off is temporal getting off, and wait, in the case of determining that it is temporal getting off, without departing until the passenger gets on again.

Note that as the determination of whether or not it is temporal getting off, an arbitrary method can be adopted. For example, each passenger registers a destination in advance by using an application program or the like. Then, the monitoring unit 161 performs face authentication of the passenger who has gotten off, and recognizes the destination of the passenger. Then, for example, the monitoring unit 161 may determine, in the case where the place where the passenger has gotten off is different from the destination of the passenger, that it is temporal getting off. Alternatively, for example, the monitoring unit 161 may determine, in the case where the destination is such a place that the passenger temporarily stops by (e.g., a service area or parking area of a highway, and convenience store), that it is temporal getting off.

Further, for example, in the case where the vehicle-exterior monitoring unit 171 detects an obstacle in the travelling direction of the vehicle 11 and the passenger gets off after the vehicle 11 stops, the passenger is assumed to have gotten off in order to remove the obstacle. In this regard, the driving control unit 163 may try not to depart again until the vehicle-exterior monitoring unit 171 recognizes that the obstacle has been removed and the passenger gets off again.

Note that the present technology is applicable also to a moving object that performs automatic driving or semi-automatic driving other than a vehicle.

For example, the present technology is applicable to a moving object used in a transportation system where stop points for passengers to get on and get off are determined. In particular, the present technology is applicable to a moving object used in a transportation system where it passes the stop point depending on the presence/absence of a passenger waiting at the stop point and the presence/absence of a passenger to get off at the stop point, such as a bus. For example, as such a moving object, a train, a water bus, or the like is assumed.

Further, for example, the present technology is applicable to a moving object used in a transportation system where passengers are capable of getting on at arbitrary places, such as a taxi. Further, for example, the present technology is applicable also to a private moving object capable of picking up an occupant at an arbitrary place, such as the above-mentioned private car.

7. Others

7-1. Configuration Example of Computer

The series of processes described above can be performed by hardware or software. In the case where the series of processes are performed by the software, programs that constitute the software are installed in a computer incorporated in dedicated hardware (e.g., processor or the like of various ECUs).

It should be noted that the program executed by the computer may be a program, the processes of which are performed in a chronological order along the description order in the specification, or may be a program, the processes of which are performed in parallel or at necessary timings when being called, for example. Alternatively, a plurality of computers may cooperate with each other to perform the above-mentioned processes. One or more computers that perform the above-mentioned processes constitute the computer system.

Note that herein, the system refers to a set of a plurality of components (apparatuses, modules (parts), and the like). Whether all the components are in the same casing or not is not considered. Therefore, both of a plurality of apparatuses stored in separate casings and connected via a network and one apparatus having a plurality of modules stored in one casing are systems.

Further, the embodiments of present technology are not limited to the above-mentioned embodiments and can be variously modified without departing from the essence of the present technology.

For example, the present technology can have the configuration of cloud computing in which one function is shared by a plurality of apparatuses via a network and processed in cooperation with each other.

Further, the steps described in the flowchart described above can be executed by one apparatus or by a plurality of apparatuses in a sharing manner.

Further, in the case where one step includes a plurality of processes, the plurality of processes in the one step can be performed by one apparatus or shared by a plurality of apparatus.

7-2. Configuration Combination Examples

The present technology may also take the following configurations.

(1) A moving object control apparatus, including
a driving control unit that performs, on a basis of recognition of at least one of a candidate for getting on a moving object or a candidate for getting off the moving object, acceleration/deceleration control of the moving object.

(2) The moving object control apparatus according to (1) above, in which
the driving control unit performs, on a basis of at least one of the recognition of the candidate for getting on or the recognition of the candidate for getting off, stop control of the moving object.

(3) The moving object control apparatus according to (1) or (2) above, in which
the driving control unit performs, on a basis of at least one of recognition of getting on the moving object of the candidate for getting on or recognition of getting off the moving object of the candidate for getting off, starting control of the moving object.

(4) The moving object control apparatus according to (3) above, in which
the recognition of the candidate for getting on is performed on an area in a vicinity of a predetermined stop candidate point of the moving object.

(5) The moving object control apparatus according to (4) above, in which
a priority recognition area is set on a basis of a predetermined reference position in the stop candidate point, the candidate for getting on being preferentially recognized in the priority recognition area.

(6) The moving object control apparatus according to (5) above, in which
the reference position is at least one of a sign indicating the stop candidate point, a predetermined structure at the stop candidate point, or a predetermined boarding position at the stop candidate point.

(7) The moving object control apparatus according to (5) or (6) above, in which
the priority recognition area is further set on a basis of at least one of a configuration of the stop candidate point or a situation around the stop candidate point.

(8) The moving object control apparatus according to any one of (5) to (7) above, in which
the reference position is changed depending on a situation around the stop candidate point.

(9) The moving object control apparatus according to any one of (4) to (8) above, in which
the area to be recognized is set to a predetermined area in a predetermined direction with respect to the moving object.

(10) The moving object control apparatus according to any one of (1) to (9), in which
the recognition of the candidate for getting on is performed on a basis of at least one of a face, an orientation of a line of sight, a position, or behavior of a person recognized in an image captured by an imaging unit of the moving object.

(11) The moving object control apparatus according to (10) above, in which
the recognition of the candidate for getting on is further performed on a basis of an image captured by an imaging apparatus outside the moving object.

(12) The moving object control apparatus according to any one of (1) to (11) above, in which
the recognition of the candidate for getting on or the candidate for getting off is performed on a basis of face authentication using an image of a face of the candidate for getting on or the candidate for getting off or data indicating a feature amount of the face, the image and the data being acquired in advance.

(13) The moving object control apparatus according to any one of (1) to (12) above, further including
a plurality of imaging units for recognizing the candidate for getting on or the candidate for getting off in different directions or different positions in the moving object, in which
the imaging unit used for processing of recognizing the candidate for getting on or the candidate for getting off is changed between when the moving object moves and when the moving object stops.

(14) The moving object control apparatus according to any one of (1) to (13) above, in which
the recognition of the candidate for getting off is performed on a basis of at least one of a position or behavior of an occupant of the moving object in an image obtained by imaging an inside of the moving object.

(15) The moving object control apparatus according to any one of (1) to (14) above, further including
a user interface control unit that controls notification of a recognition result of the candidate for getting on.

(16) The moving object control apparatus according to (15) above, in which
the user interface control unit superimposes, on an image captured by an imaging unit of the moving object, information indicating the recognition result of the candidate for getting on, and displays the image.

(17) The moving object control apparatus according to (15) or (16) above, in which
the user interface control unit superimposes, on a field of view of an occupant of the moving object, information indicating the recognition result of the candidate for getting on, for display.

(18) A moving object control method, including
a driving control step of performing, on a basis of recognition of at least one of a candidate for getting on a moving object or a candidate for getting off the moving object, acceleration/deceleration control of the moving object.

(19) A moving object, including
a driving control unit that performs, on a basis of recognition of at least one of a candidate for getting on or a candidate for getting off, acceleration/deceleration control.

REFERENCE SIGNS LIST 11 vehicle
21 front sensing camera
22 front camera ECU
23 position information acquisition unit
24 display unit
25 communication unit
27 radar
28 lidar
29, 29L, 29R side view camera
30, 30L, 30R side view camera ECU
31 integrated ECU
32 front view camera
33 front view camera ECU
34 braking device
39 rear view camera
40 rear view camera ECU
42 in-vehicle camera
43 in-vehicle camera ECU
51 driving control ECU
101 image composition ECU
151 vehicle control unit
161 monitoring unit
162 situation recognition unit
163 travelling control unit
164 stop position recognition unit
165 imaging control unit
166 UI control unit
171 vehicle-exterior monitoring unit
172 in-vehicle monitoring unit
201 bus
221F1 to 221B camera
Pa to Pe stop reference position
A1a to A2e priority recognition area
521 camera

The invention claimed is:

1. A vehicle control apparatus, comprising:
a controller configured to control acceleration or deceleration of a vehicle on a basis of recognition, while the vehicle is moving, of at least one of a person who is outside the vehicle as a candidate for getting on the vehicle or a person who is a passenger on the vehicle as a candidate for getting off the vehicle,
wherein the recognition of the candidate for getting on the vehicle is performed within a priority recognition area in a vicinity of a stop of the vehicle, the stop being a scheduled location for getting on the vehicle or off the vehicle, the priority recognition area being set on a basis of a predetermined reference position in the vicinity of the stop.

2. The vehicle control apparatus according to claim 1, wherein
the controller is further configured to control stopping of the vehicle on a basis of at least one of the recognition of the candidate for getting on the vehicle or the recognition of the candidate for getting off the vehicle.

3. The vehicle control apparatus according to claim 1, wherein
the controller is further configured to control starting of the vehicle on a basis of at least one of recognition of the candidate for getting on the vehicle getting on the vehicle or recognition of the candidate for getting off the vehicle getting off the vehicle.

4. The vehicle control apparatus according to claim 1, wherein
the reference position is at least one of a sign indicating the stop, a predetermined structure at the stop, or a predetermined boarding position at the stop.

5. The vehicle control apparatus according to claim 1, wherein
the priority recognition area is further set on a basis of at least one of a configuration of the stop or a situation around the stop.

6. The vehicle control apparatus according to claim 1, wherein
the reference position is changed depending on a situation around the stop.

7. The vehicle control apparatus according to claim 1, wherein
the priority recognition area is set to a predetermined area in a predetermined direction with respect to the vehicle.

8. The vehicle control apparatus according to claim 1, wherein
the recognition of the candidate for getting on the vehicle is performed on a basis of at least one of a face, an orientation of a line of sight, a position, or behavior of a person recognized in an image captured by a camera of the vehicle.

9. The vehicle control apparatus according to claim 8, wherein
the recognition of the candidate for getting on the vehicle is further performed on a basis of an image captured by a camera outside the vehicle.

10. The vehicle control apparatus according to claim 1, wherein
the recognition of the candidate for getting on the vehicle or the candidate for getting off the vehicle is performed on a basis of face authentication using an image of a face of the candidate for getting on the vehicle or the candidate for getting off the vehicle or data indicating a feature amount of the face, the image and the data being acquired in advance.

11. The vehicle control apparatus according to claim 1, further comprising:
a plurality of cameras configured to image the candidate for getting on the vehicle or the candidate for getting off the vehicle in different directions or different positions in the vehicle, wherein
a camera configured to image the candidate for getting on the vehicle or the candidate for getting off the vehicle is changed between when the vehicle moves and when the vehicle stops.

12. The vehicle control apparatus according to claim 1, wherein
the recognition of the candidate for getting off the vehicle is performed on a basis of at least one of a position or behavior of an occupant of the vehicle in an image obtained by imaging an inside of the vehicle.

13. The vehicle control apparatus according to claim 1, further comprising:
a user interface controller configured to control notification of a recognition result of the candidate for getting on the vehicle.

14. The vehicle control apparatus according to claim 13, wherein
the user interface controller is configured to superimpose, on an image captured by a camera of the vehicle, information indicating the recognition result of the candidate for getting on the vehicle, and display the image.

15. The vehicle control apparatus according to claim 13, wherein
the user interface controller is configured to superimpose, on a field of view of an occupant of the vehicle, information indicating the recognition result of the candidate for getting on the vehicle, for display.

16. A vehicle control method, comprising:
controlling acceleration or deceleration of a vehicle on a basis of recognition of at least one of a person who is outside the vehicle as a candidate for getting on the vehicle or a person who is a passenger on the vehicle as a candidate for getting off the vehicle,
wherein the recognition of the candidate for getting on the vehicle is performed within a priority recognition area in a vicinity of a stop of the vehicle, the stop being a scheduled location for getting on the vehicle or off the vehicle, the priority recognition area being set on a basis of a predetermined reference position in the vicinity of the stop.

17. A vehicle, comprising:
a controller configured to control acceleration or deceleration of the vehicle on a basis of recognition of at least one of a person who is outside the vehicle as a candidate for getting on the vehicle or a person who is a passenger on the vehicle as a candidate for getting off the vehicle,
wherein the recognition of the candidate for getting on the vehicle is performed within a priority recognition area in a vicinity of a stop of the vehicle, the stop being a scheduled location for getting on the vehicle or off the vehicle, the priority recognition area being set on a basis of a predetermined reference position in the vicinity of the stop.

18. The vehicle control apparatus according to claim 1, wherein
the recognition of at least one of the person who is outside the vehicle as the candidate for getting on the vehicle or the person who is the passenger on the vehicle as the candidate for getting off the vehicle comprises determination of at least one of a score indicating that the person who is outside the vehicle is the candidate for getting on the vehicle or a score indicating that the person who is the passenger on the vehicle is the candidate for getting off the vehicle.

* * * * *